US012644605B2

(12) United States Patent
Hahm et al.

(10) Patent No.: US 12,644,605 B2
(45) Date of Patent: Jun. 2, 2026

(54) GAS TURBINE ENGINE COMBUSTOR HAVING CERAMIC MATRIX COMPOSITE (CMC) LINERS AND CMC DOME

(71) Applicant: General Electric Company, Schenectady, NY (US)

(72) Inventors: Trevor James Hahm, Cincinnati, OH (US); Gerardo Antonio Salazar Lois, West Chester, OH (US); Daniel J. Kirtley, Blue Ash, OH (US); Ryan Christopher Jones, West Chester, OH (US); Adam Robert Kahn, Mason, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/604,921

(22) Filed: Mar. 14, 2024

(65) Prior Publication Data

US 2025/0290636 A1    Sep. 18, 2025

(51) Int. Cl.
  *F23R 3/60*        (2006.01)
  *F02C 3/14*        (2006.01)
(52) U.S. Cl.
  CPC ................. *F23R 3/60* (2013.01); *F02C 3/14* (2013.01); *F05D 2240/35* (2013.01); *F05D 2300/6033* (2013.01)
(58) Field of Classification Search
  CPC ...................................................... F23R 3/007
  See application file for complete search history.

(56) References Cited

U.S. PATENT DOCUMENTS

| | | | | |
|---|---|---|---|---|
| 5,285,632 A | * | 2/1994 | Halila ....................... | F23R 3/10 |
| | | | | 60/753 |
| 5,291,733 A | | 3/1994 | Halila | |
| 6,148,600 A | | 11/2000 | Farmer et al. | |
| 6,725,667 B2 | | 4/2004 | Farmer et al. | |
| 9,976,746 B2 | | 5/2018 | Bloom et al. | |
| 10,197,278 B2 | | 2/2019 | Bloom et al. | |
| 10,281,153 B2 | | 5/2019 | Hannwacker et al. | |
| 10,663,167 B2 | | 5/2020 | Dziech | |
| 11,339,966 B2 | | 5/2022 | Bilse et al. | |
| 11,662,096 B2 | | 5/2023 | Salazar Lois et al. | |
| 2002/0184887 A1 | * | 12/2002 | Calvez .................... | F23R 3/007 |
| | | | | 60/804 |
| 2004/0118122 A1 | * | 6/2004 | Mitchell ................... | F23R 3/60 |
| | | | | 60/752 |
| 2005/0034459 A1 | * | 2/2005 | McMasters ............... | F23R 3/50 |
| | | | | 60/752 |
| 2005/0034460 A1 | * | 2/2005 | McMasters ............... | F23R 3/10 |
| | | | | 60/752 |

(Continued)

*Primary Examiner* — David P. Olynick

(74) *Attorney, Agent, or Firm* — Venable LLP; Edward A. Kmett; Michele V. Frank

(57) ABSTRACT

A combustor for a gas turbine engine includes a ceramic matrix composite (CMC) dome structure, a metallic cowl structure including a single yoke outer cowl connecting flange and a single yoke inner cowl connecting flange, a CMC outer liner, and a CMC inner liner. An outer connection connects the outer cowl connecting flange, the CMC dome structure, and the CMC outer liner in an outer stacked arrangement, and an inner connection connects the inner cowl connecting flange, the CMC dome structure, and the CMC inner liner in an inner stacked arrangement.

20 Claims, 13 Drawing Sheets

(56)            References Cited

U.S. PATENT DOCUMENTS

| | | | | |
|---|---|---|---|---|
| 2017/0059167 | A1* | 3/2017 | Bloom | F23R 3/007 |
| 2017/0248316 | A1* | 8/2017 | Hannwacker | F23R 3/60 |
| 2018/0010797 | A1* | 1/2018 | Marusko | F23R 3/60 |
| 2018/0356095 | A1* | 12/2018 | Patel | F23R 3/283 |
| 2019/0203939 | A1* | 7/2019 | Stieg | F23R 3/007 |
| 2019/0203940 | A1* | 7/2019 | Stieg | F23R 3/60 |
| 2022/0282870 | A1* | 9/2022 | Kim | F23R 3/286 |
| 2023/0119008 | A1 | 4/2023 | Jones et al. | |

* cited by examiner

GAS TURBINE ENGINE COMBUSTOR HAVING CERAMIC MATRIX COMPOSITE (CMC) LINERS AND CMC DOME

TECHNICAL FIELD

The present disclosure relates to a combustor for a gas turbine engine, and, more particularly, a combustor that has ceramic matrix composite (CMC) liners and a CMC dome connected to a metallic cowl structure.

BACKGROUND

Gas turbine engines generally include a combustor. The combustor may be an annular combustor that includes a combustor liner, which may include an outer liner and an inner liner that are connected to a dome, with a combustion chamber being defined between the inner liner and the outer liner. The outer liner and the inner liner may also be connected to a cowl structure. The cowl structure may generally be a metallic structure, while, in some cases, the outer liner and the inner liner may be formed of a CMC material. In some cases, the dome may also be formed of a CMC material.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
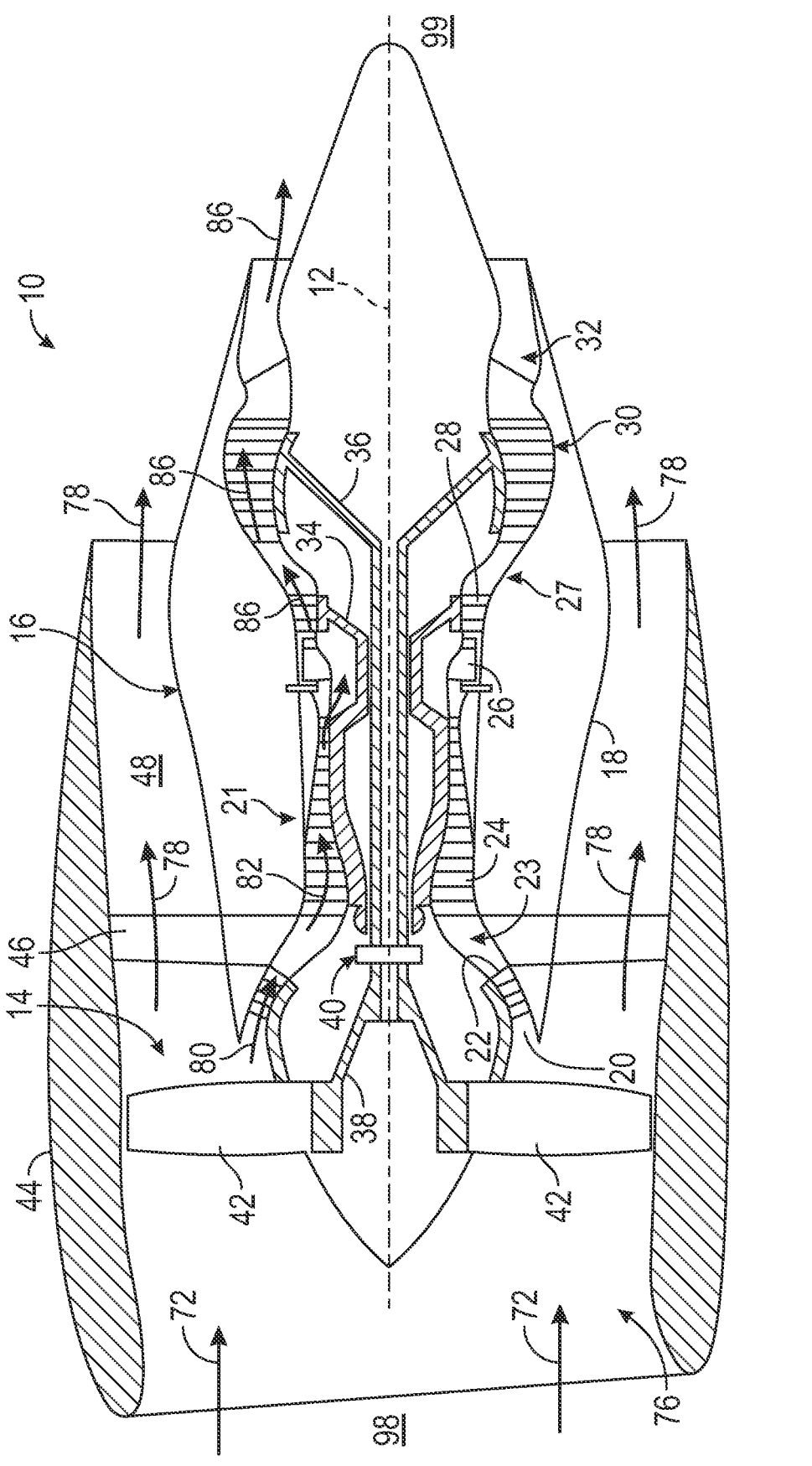
FIG. 1 is a schematic partial cross-sectional side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial," "axially," and "longitudinal" refer to directions and orientations that extend substantially parallel to a centerline axis of the turbine engine. Moreover, the terms "radial" and "radially" refer to directions and orientations that extend substantially perpendicular to the centerline axis of the turbine engine. In addition, as used herein, the terms "circumferential" and "circumferentially" refer to directions and orientations that extend arcuately about the centerline axis of the turbine engine.

The terms "outer" and "inner" refer to the relative direction with respect to the radial direction extending perpendicular to the centerline axis. For example, "outer" refers to an element or a part of an element (e.g., a side of an element) further away from the centerline axis in the radial direction, and "inner" refers to an element or a part of an element (e.g., a side of an element) closer to the centerline axis in the radial direction.

The terms "outward" and "inward" refer to the relative direction with respect to the radial direction extending from a defined part of an element. For example, "outward" refers to a direction extending radially from the defined part of the element away from the centerline axis in the radial direction. The term "inward" refers to a direction extending radially from the defined part of the element toward the centerline axis in the radial direction.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The term "composite," as used herein, is indicative of a material having two or more constituent materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC). The composite may be formed of a matrix material and a reinforcing element, such as a fiber (referred to herein as a reinforcing fiber).

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to by their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled (e.g., form fiber tows) and/or coated prior to inclusion within the matrix. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or a burn-out to yield a high char residue in the preform, and subsequent melt-infiltration with silicon, or a cure or a pyrolysis to yield a silicon carbide matrix in the preform, and subsequent chemical vapor infiltration with silicon carbide. Additional steps may be taken to improve densification of the preform, either before or after chemical vapor infiltration, by injecting the preform with a liquid resin or a polymer followed by a thermal processing step to fill the voids with silicon carbide. CMC material as used herein may be formed using any known or hereafter developed methods including but not limited to melt infiltration, chemical vapor infiltration, polymer impregnation pyrolysis (PIP), or any combination thereof.

The term "metallic" as used herein is indicative of a material that includes metal such as, but not limited to, titanium, iron, aluminum, stainless steel, and nickel alloys. A metallic material or an alloy can be a combination of at least two or more elements or materials, where at least one is a metal.

Gas turbine engines generally include a combustor. The combustor may be an annular combustor that includes a combustor liner, which may include an outer liner and an inner liner that are connected to a dome structure, with a combustion chamber being defined between the inner liner and the outer liner. The outer liner, the inner liner, and the dome structure may also be connected to a cowl structure via a double yoke (or clevis-type) of connection. The cowl structure may generally be a metallic structure and includes an outer double yoke clevis and an inner double yoke clevis for connecting the outer liner, the inner liner, and the dome structure to the cowl structure. The double yoke (clevis-type) of connection, while being effective for connecting the combustor components together, increases the overall radial profile of the combustor and increases the weight of the cowl structure since the cowl structure is generally metallic.

The present disclosure provides a combustor in which the cowl structure includes a single yoke, or a single connecting flange, on both the outer and inner sides of the cowl structure for connecting a CMC outer liner, a CMC inner liner, and a CMC dome structure to the metallic cowl structure. According to the present disclosure, the cowl structure has an outer cowl connecting flange that is connected to an outer liner connecting flange of the CMC outer liner and to an outer dome connecting flange of the CMC dome structure. By including the single outer cowl connecting flange on the cowl structure, various stacking arrangements of the outer cowl connecting flange, the outer liner connecting flange, and the outer dome connecting flange can be included to provide a simplified outer structure between the outer components. Similarly, by including the single inner cowl connecting flange on the cowl structure, various stacking arrangements of the inner cowl connecting flange, the inner liner connecting flange, and the inner dome connecting flange can be included to provide a simplified inner structure between the inner components. In addition, by eliminating the second connecting flange from the cowl structure that is used on the double yoke (clevis-type) connection, the overall radial height of the metallic cowl structure is reduced, and the weight of the metallic cowl structure is also reduced.

FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine-based turbine engines, industrial turbine engines, and auxiliary power units. The present disclosure is also applicable to unducted fan (or open rotor) turbine engines. As shown in FIG. 1, the engine 10 has a longitudinal centerline axis 12 that extends therethrough from an upstream end 98 to a downstream end 99 for reference purposes. In general, the engine 10 may include a fan assembly 14 and a turbo-engine 16 disposed downstream from the fan assembly 14.

The turbo-engine 16 may generally include an outer casing 18 that defines an annular inlet 20 to a core airflow path 23 of the turbo-engine 16. The outer casing 18 encases, or at least partially, forms, in serial flow relationship, a compressor section 21 having a low pressure compressor (LPC) 22 and a high pressure compressor (HPC) 24, a combustion section 26, a turbine section 27 including a high pressure turbine (HPT) 28 and a low pressure turbine (LPT) 30, and a jet exhaust nozzle section 32. A high pressure rotor shaft 34 drivingly connects the HPT 28 to the HPC 24. A low pressure rotor shaft 36 drivingly connects the LPT 30 to the LPC 22. The low pressure rotor shaft 36 may also be connected to a fan shaft 38 of the fan assembly 14. In particular embodiments, as shown in FIG. 1, the low pressure rotor shaft 36 may be connected to the fan shaft 38 by way of a reduction gearbox 40, such as in an indirect-drive or a geared-drive configuration.

As shown in FIG. 1, the fan assembly 14 includes a plurality of fan blades 42 that are coupled to, and that extend radially outwardly from, the fan shaft 38. An annular fan casing or a nacelle 44 circumferentially surrounds the fan assembly 14 and/or at least a portion of the turbo-engine 16. The nacelle 44 may be supported relative to the turbo-engine 16 by a plurality of circumferentially spaced outlet guide vanes (or struts) 46. Moreover, at least a portion of the nacelle 44 may extend over an outer portion of the turbo-engine 16 so as to define a bypass airflow passage 48 therebetween.

Figure 2:
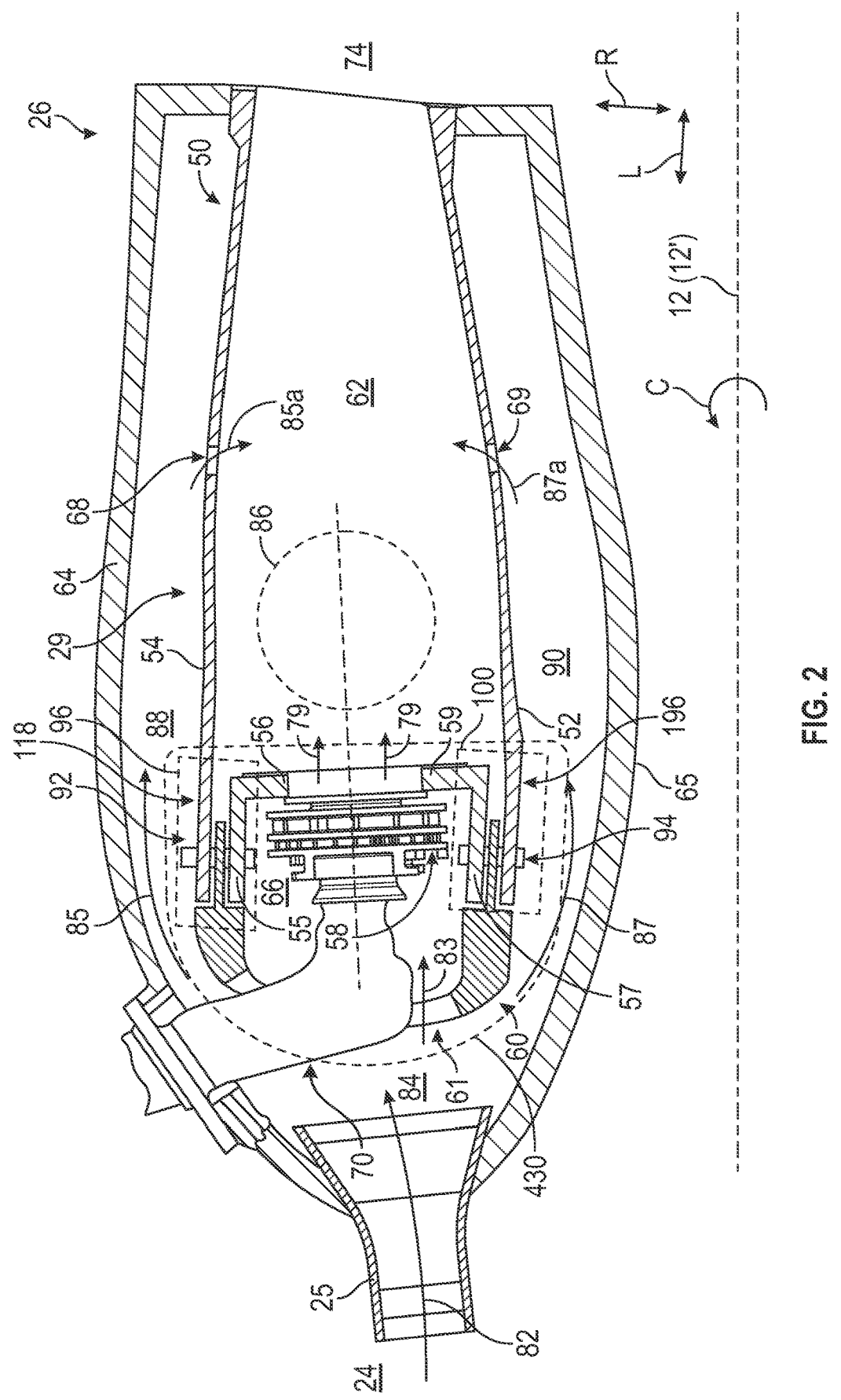
FIG. 2 is a partial cross-sectional side view of an exemplary combustor, according to an aspect of the present disclosure.

FIG. 2 is a partial cross-sectional side view of an exemplary combustion section 26 of the turbo-engine 16 as shown in FIG. 1, according to an aspect of the present disclosure. The exemplary combustion section 26 shown in FIG. 2 is an annular type combustion section that extends circumferentially about a combustor centerline axis 12', which is congruent with the longitudinal centerline axis 12 of the engine 10. While the combustion section 26 is annular about combustor centerline axis 12', only an upper portion of the combustion section 26 is shown in the cross-sectional view of FIG. 2. The combustion section 26 includes an annular combustor outer casing 64, an annular combustor inner casing 65 that surround a combustor 29. The combustor 29 includes an annular combustor liner 50 arranged between the annular combustor outer casing 64 and the annular combustor inner casing 65. As shown in FIG. 2, the annular combustor liner 50 includes an annular CMC inner liner 52, and an annular CMC outer liner 54, each of which extends circumferentially about the combustor centerline axis 12' so as to be annular liners. The CMC outer liner 54 and the CMC inner liner 52 may be either a single piece liner, or may be constructed of a plurality of individual sections that may be connected together so as to form the annular liner. Each of the annular CMC outer liner 54 and the annular CMC inner liner 52 is constructed of a CMC material, as defined above. A CMC dome structure 56, which is constructed of the CMC material, includes a dome plate 59 that extends between an outer dome connecting flange 55 and an inner dome connecting flange 57 of the CMC dome structure 56. The CMC dome structure 56 extends between the CMC outer liner 54 and the CMC inner liner 52, and the CMC dome structure 56 also extends circumferentially about the combustor centerline axis 12' so as to define an annular CMC dome structure. The CMC dome structure 56 may be either a single piece CMC dome structure, or may be constructed of a plurality of individual sections that may be connected together so as to form the annular CMC dome structure 56.

As will be described in more detail below, the CMC inner liner 52 and the CMC outer liner 54 are connected to the CMC dome structure 56, thereby defining a combustion chamber 62 therebetween. The CMC inner liner 52 and the CMC outer liner 54 extend from the CMC dome structure 56 to a turbine nozzle 74 (depicted generally) at an entry to the HPT 28 (FIG. 1), thus, at least partially defining a hot gas path between the CMC dome structure 56 and the HPT 28. In addition, as will be described in more detail below, a metallic cowl structure 60 is connected to the CMC inner liner 52, to the CMC outer liner 54, and to the CMC dome structure 56 via an outer connection 92 and via an inner connection 94, thereby defining a pressure plenum 66 therewithin. The outer connection 92 and the inner connection 94 will be described in more detail below. The cowl structure 60 extends circumferentially about the combustor centerline axis 12', and may be constructed as a single piece cowl structure, or may constitute a plurality of individual cowl sections that are connected together so as to form an annular cowl structure 60. The cowl structure 60 may generally be constructed of a metallic material, as defined above.

The combustion section 26 further includes a plurality of swirler assemblies 58 (one shown in FIG. 2) that are connected to the CMC dome structure 56 through respective openings in the dome plate 59 of the CMC dome structure 56. In addition, a plurality of fuel nozzle assemblies 70 (one shown in FIG. 2) are connected to the combustor outer casing 64, and each fuel nozzle assembly 70 extends through a respective cowl opening 61 in the cowl structure 60, and is connected with a respective swirler assembly 58.

As shown in FIG. 2, the combustion section 26 includes a diffusor 25, and the combustor outer casing 64 and the combustor inner casing 65 are connected to the diffusor 25. The diffusor 25 is in fluid communication with the HPC 24, and, as will be described below, provides a flow of compressed air 82 into a plenum 84 defined between the combustor outer casing 64 and the combustor inner casing 65. The combustor outer casing 64 and the combustor inner casing 65 also surround the combustor liner 50, and define an outer flow passage 88 between the combustor outer casing 64 and the CMC outer liner 54, and an inner flow passage 90 between the combustor inner casing 65 and the CMC inner liner 52. The CMC outer liner 54 may include a plurality of dilution openings 68 (one shown in FIG. 2) therethrough, and the CMC inner liner 52 may include a plurality of dilution openings 69 (one shown in FIG. 2) therethrough. The dilution openings 68 provide fluid communication through the CMC outer liner 54 between the outer flow passage 88 and the combustion chamber 62, and the dilution openings 69 provide fluid communication through the CMC inner liner 52 between the inner flow passage 90 and the combustion chamber 62.

Referring collectively to FIGS. 1 and 2, during operation of the engine 10, a volume of air 72, as indicated schematically by arrows, enters the engine 10 from the upstream end 98 through an associated nacelle inlet 76 of the nacelle 44 and/or the fan assembly 14. As the air 72 passes across the fan blades 42, a portion of the air 72 is propelled by the fan blades 42 through the fan assembly 14, and is directed or routed into the bypass airflow passage 48 as a bypass airflow 78. Another portion of the air 72 is directed or routed into the LPC 22 via the annular inlet 20 as a compressor inlet air 80. The compressor inlet air 80 is progressively compressed by the LPC 22 and the HPC 24 to form the compressed air 82 as the compressor inlet air 80 flows from the annular inlet 20 through the LPC 22 and the HPC 24 towards the combustion section 26. As shown in FIG. 2, the compressed air 82 flows through the diffusor 25 and into the plenum 84 of the combustion section 26 to pressurize the plenum 84. A first portion of the compressed air 82 in the plenum 84, as indicated schematically by an arrow denoting compressed air 83, flows from the plenum 84 through the cowl opening 61 into the pressure plenum 66 of the cowl structure 60. The compressed air 83 in the pressure plenum 66 flows through the swirler assemblies 58, where the compressed air 83 is mixed with fuel provided by the fuel nozzle assemblies 70 to the swirler assemblies 58 to generate a fuel-air mixture 79. The fuel-air mixture 79 is then ejected from the swirler assemblies 58 into the combustion chamber 62, and the fuel-air mixture 79 is ignited by an ignitor (not shown) and burned within the combustion chamber 62 to generate combustion gases 86 within the combustion chamber 62.

A second portion of the compressed air 82 in the plenum 84, as indicated schematically by arrows denoting compressed air 85 and compressed air 87, may be routed into the outer flow passage 88, and into the inner flow passage 90, respectively. A portion of the compressed air 85 flowing through the outer flow passage 88, shown schematically as compressed air 85a, may be routed through the plurality of dilution openings 68 of the CMC outer liner 54 into the combustion chamber 62 to provide quenching of the combustion gases 86. Similarly, a portion of the compressed air 87 flowing through the inner flow passage 90, shown schematically as compressed air 87a, may be routed through the plurality of dilution openings 69 of the CMC inner liner 52 into the combustion chamber 62 to provide quenching of the combustion gases 86.

Referring still to FIGS. 1 and 2 collectively, the combustion gases 86 generated in the combustion chamber 62 flow into the HPT 28 (FIG. 1) via the turbine nozzle 74 (FIG. 2), thus causing the HPT 28 to rotate, which drives the high pressure rotor shaft 34, thereby driving the HPC 24 to support operation of the HPC 24. As shown in FIG. 1, the combustion gases 86 are then routed from the HPT 28 to the LPT 30, thereby causing the LPT 30 to rotate, which drives the low pressure rotor shaft 36, thereby driving the LPC 22 to support operation of the LPC 22 and/or rotation of the fan shaft 38 via the reduction gearbox 40. The combustion gases 86 are then exhausted through the jet exhaust nozzle section 32 of the turbo-engine 16 to provide propulsion at the downstream end 99 of the engine 10.

Figure 3:
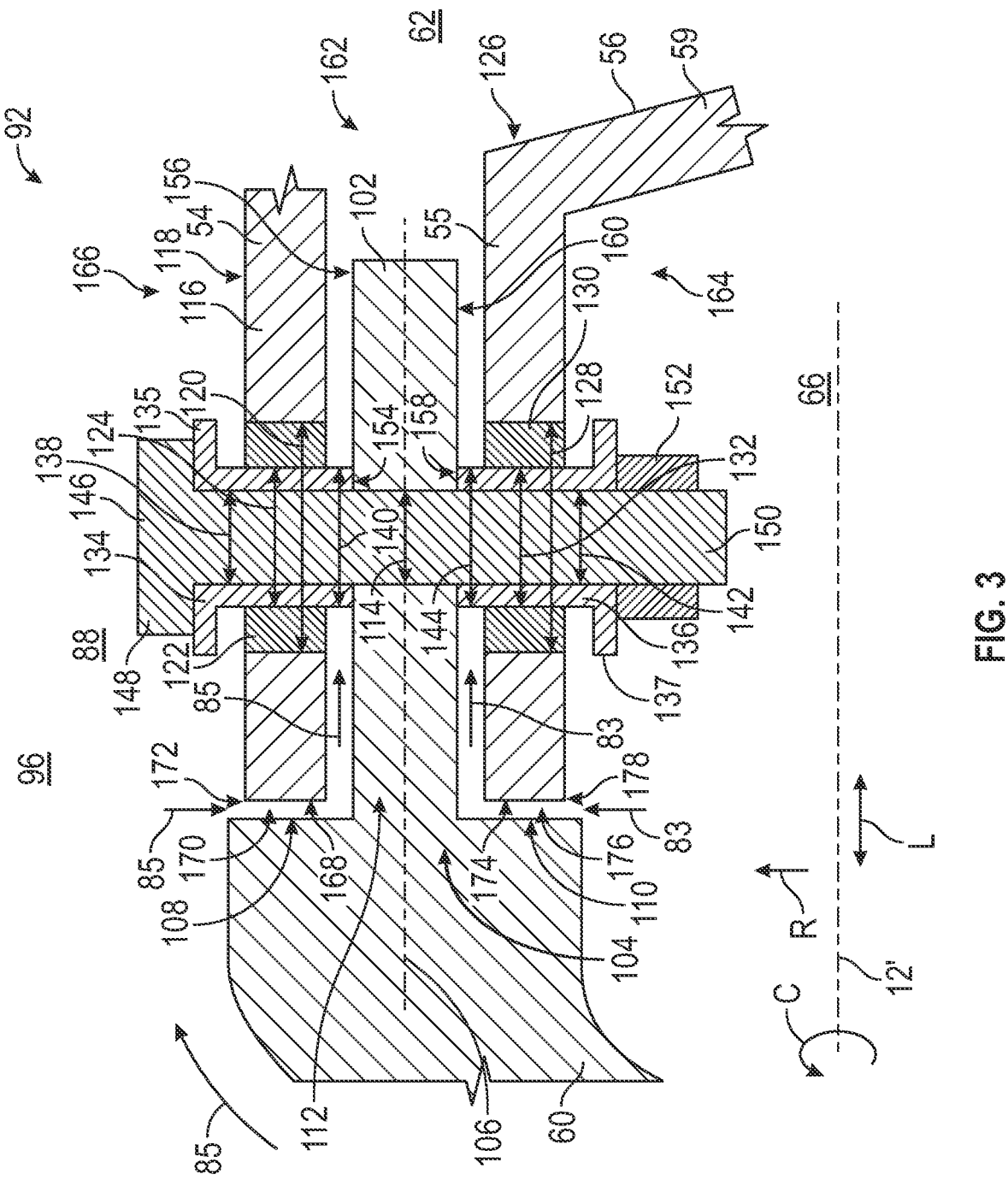
FIG. 3 is an enlarged partial cross-sectional view of an outer connection, taken at detail view 96 of FIG. 2, according to an aspect of the present disclosure.

FIG. 3 is an enlarged partial cross-sectional view of the outer connection 92, taken at detail view 96 of FIG. 2, according to an aspect of the present disclosure. In the FIG. 3 aspect, the cowl structure 60 includes a single yoke outer cowl connecting flange 102 that extends in the longitudinal direction L with respect to the combustor centerline axis 12' from an outer cowl flange root portion 104 of the cowl structure 60. In the FIG. 3 aspect, the outer cowl connecting flange 102 is generally arranged to extend from a central portion 106 of the outer cowl flange root portion 104. The outer cowl flange root portion 104 includes a first outer discourager wall portion 108 extending radially outward from an upstream end 112 of the outer cowl connecting flange 102, and a second outer discourager wall portion 110 extending radially inward from the upstream end 112 of the outer cowl connecting flange 102. The outer cowl connecting flange 102 also includes an outer cowl connecting flange opening 114 therethrough.

The CMC outer liner 54 includes an outer liner connecting flange 116 extending in the longitudinal direction L at an upstream end 118 (see also, FIG. 2) of the CMC outer liner 54. In the FIG. 3 aspect, the outer liner connecting flange 116 includes an outer liner connecting flange opening 120 therethrough. An outer liner connecting flange bushing 122 may be installed within the outer liner connecting flange opening 120, and the outer liner connecting flange bushing 122 includes an outer liner connecting flange bushing opening 124 therethrough.

The CMC dome structure 56 includes the outer dome connecting flange 55 that extends in the longitudinal direction L from an outer side 126 of the dome plate 59. The outer dome connecting flange 55 includes an outer dome connecting flange opening 128 therethrough. An outer dome connecting flange bushing 130 may be installed within the outer dome connecting flange opening 128, and the outer dome connecting flange bushing 130 includes an outer dome connecting flange bushing opening 132 therethrough.

The outer connection 92 of the FIG. 3 aspect further includes a first outer connection bushing 134 and a second outer connection bushing 136. The first outer connection bushing has an opening 138 therethrough, has an outer diameter 140, and has a flange 135. The second outer connection bushing 136 has an opening 142 therethrough, has an outer diameter 144, and has a flange 137. The outer diameter 140 of the first outer connection bushing 134 is slightly less than an inner diameter of the outer liner connecting flange bushing opening 124. The first outer connection bushing 134 is inserted through the outer liner connecting flange bushing opening 124 so that the outer liner connecting flange bushing 122 and the first outer connection bushing 134 slidingly engage with one another to allow radial movement of the CMC outer liner connecting flange 116. Similarly, the outer diameter 144 of the second outer connection bushing 136 is slightly less than an inner diameter of the outer dome connecting flange bushing opening 132. The second outer connection bushing 136 is inserted through the outer dome connecting flange bushing opening 132 so that the outer dome connecting flange bushing 130 and the second outer connection bushing 136 slidingly engage with one another to allow radial movement of the CMC outer dome connecting flange 55.

An outer connection fastener 146 (e.g., a bolt) includes a head 148 and a shank 150. The shank 150 is inserted through the opening 138 of the first outer connection bushing 134, through the outer cowl connecting flange opening 114, and through the opening 142 of the second outer connection bushing 136 until the head 148 engages with the flange 135 of the first outer connection bushing 134. A retention member 152 (e.g., a nut) threadedly engages with the shank 150 and is torqued so that an inner side 154 of the first outer connection bushing 134 engages with an outer side 156 of the outer cowl connecting flange 102, and so that an outer side 158 of the second outer connection bushing 136 engages with an inner side 160 of the outer cowl connecting flange 102.

The foregoing arrangement of FIG. 3, therefore, provides for an outer stacked arrangement 162 with respect to the radial direction R in which the outer dome connecting flange 55 is arranged on an inner side 164 of the outer stacked arrangement 162, the outer liner connecting flange 116 is arranged on an outer side 166 of the outer stacked arrangement 162, and the outer cowl connecting flange 102 is arranged between the outer dome connecting flange 55 and the outer liner connecting flange 116.

In addition, an upstream end 168 of the outer liner connecting flange 116 is arranged adjacent to the first outer discourager wall portion 108 with a gap 170 therebetween, such that, the upstream end 168 of the outer liner connecting flange 116 and the first outer discourager wall portion 108 define an outer liner connecting flange discourager 172. The outer liner connecting flange discourager 172 functions as a seal so as to restrict or to limit the amount of the compressed air 85 that may pass from the outer flow passage 88 through the gap 170 and between the outer liner connecting flange 116 and the outer cowl connecting flange 102 into the combustion chamber 62.

Similarly, an upstream end 174 of the outer dome connecting flange 55 is arranged adjacent to the second outer discourager wall portion 110 with a gap 176 therebetween, such that, the upstream end 174 of the outer dome connecting flange 55 and the second outer discourager wall portion 110 define an outer dome connecting flange discourager 178. The outer dome connecting flange discourager 178 functions as a seal so as to restrict or to limit the amount of the compressed air 83 that may pass from the pressure plenum 66 through the gap 176 and between the outer dome connecting flange 55 and the outer cowl connecting flange 102 into the combustion chamber 62.

Figure 4:
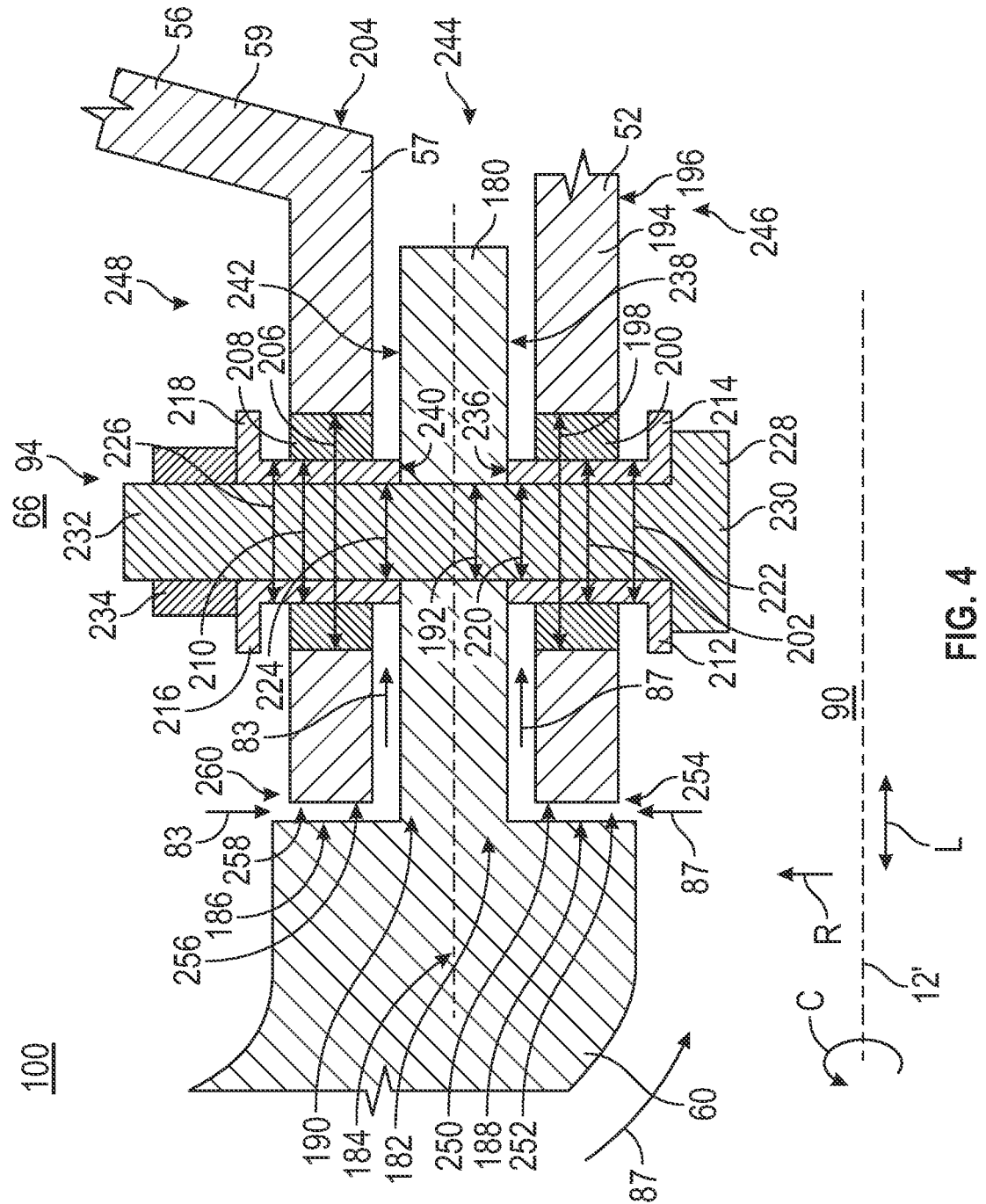
FIG. 4 is an enlarged partial cross-sectional view of an inner connection, taken at detail view 100 of FIG. 2, according to an aspect of the present disclosure.

FIG. 4 is an enlarged partial cross-sectional view of the inner connection 94, taken at detail view 100 of FIG. 2, according to an aspect of the present disclosure. In the FIG. 4 aspect, the cowl structure 60 includes a single yoke inner cowl connecting flange 180 that extends in the longitudinal direction L with respect to the combustor centerline axis 12' from an inner cowl flange root portion 182 of the cowl structure 60. In the FIG. 4 aspect, the inner cowl connecting flange 180 is generally arranged to extend from a central portion 184 of the inner cowl flange root portion 182. The inner cowl flange root portion 182 includes a first inner discourager wall portion 186 extending radially outward from an upstream end 190 of the inner cowl connecting flange 180, and a second inner discourager wall portion 188 extending radially inward from the upstream end 190 of the inner cowl connecting flange 180. The inner cowl connecting flange 180 also includes an inner cowl connecting flange opening 192 therethrough.

The CMC inner liner 52 includes an inner liner connecting flange 194 extending in the longitudinal direction L at an upstream end 196 (see also, FIG. 2) of the CMC inner liner 52. In the FIG. 4 aspect, the inner liner connecting flange 194 includes an inner liner connecting flange opening 198 therethrough. An inner liner connecting flange bushing 200 may be installed within the inner liner connecting flange opening 198, and the inner liner connecting flange bushing 200 includes an inner liner connecting flange bushing opening 202 therethrough.

The CMC dome structure 56 includes the inner dome connecting flange 57 that extends in the longitudinal direction L from an inner side 204 of the dome plate 59. The inner dome connecting flange 57 includes an inner dome connecting flange opening 206 therethrough. An inner dome connecting flange bushing 208 may be installed within the inner dome connecting flange opening 206, and the inner dome connecting flange bushing 208 includes an inner dome connecting flange bushing opening 210 therethrough.

The inner connection 94 of the FIG. 4 aspect further includes a first inner connection bushing 212 and a second inner connection bushing 216. The first inner connection bushing 212 has an opening 220 therethrough, has an outer diameter 222, and has a flange 214. The second inner connection bushing 216 has an opening 224 therethrough, has an outer diameter 226, and has a flange 218. The outer diameter 222 of the first inner connection bushing 212 is slightly less than an inner diameter of the inner liner connecting flange bushing opening 202. The first inner connection bushing 212 is inserted through the inner liner connecting flange bushing opening 202 so that the inner liner connecting flange bushing 200 and the first inner connection bushing 212 slidingly engage with one another to allow radial movement of the CMC inner liner connecting flange 194. Similarly, the outer diameter 226 of the second inner connection bushing 216 is slightly less than an inner diameter of the inner dome connecting flange bushing opening 210. The second inner connection bushing 216 is inserted through the inner dome connecting flange bushing opening 210 so that the inner dome connecting flange bushing 208 and the second inner connection bushing 216 slidingly engage with one another to allow radial movement of the CMC inner dome connecting flange 57.

An inner connection fastener 228 (e.g., a bolt) includes a head 230 and a shank 232. The shank 232 is inserted through the opening 220 of the first inner connection bushing 212, through the inner cowl connecting flange opening 192, and through the opening 224 of the second inner connection bushing 216 until the head 230 engages with the flange 214 of the first inner connection bushing 212. A retention member 234 (e.g., a nut) threadedly engages with the shank 232 and is torqued so that an outer side 236 of the first inner connection bushing 212 engages with an inner side 238 of the inner cowl connecting flange 180, and so that an inner side 240 of the second inner connection bushing 216 engages with an outer side 242 of the inner cowl connecting flange 180.

The foregoing arrangement of FIG. 4, therefore, provides for an inner stacked arrangement 244 with respect to the radial direction R in which the inner liner connecting flange 194 is arranged on an inner side 246 of the inner stacked arrangement 244, the inner dome connecting flange 57 is arranged on an outer side 248 of the inner stacked arrangement 244, and the inner cowl connecting flange 180 is arranged between the inner liner connecting flange 194 and the inner dome connecting flange 57.

In addition, an upstream end 250 of the inner liner connecting flange 194 is arranged adjacent to the second inner discourager wall portion 188 with a gap 252 therebetween, such that, the upstream end 250 of the inner liner connecting flange 194 and the second inner discourager wall portion 188 define an inner liner connecting flange discourager 254. The inner liner connecting flange discourager 254 functions as a seal so as to restrict or to limit the amount of the compressed air 87 that may pass from the inner flow passage 90 through the gap 252 and between the inner liner connecting flange 194 and the inner cowl connecting flange 180 into the combustion chamber 62.

Similarly, an upstream end 256 of the inner dome connecting flange 57 is arranged adjacent to the first inner discourager wall portion 186 with a gap 258 therebetween, such that, the upstream end 256 of the inner dome connecting flange 57 and the first inner discourager wall portion 186 define an inner dome connecting flange discourager 260. The inner dome connecting flange discourager 260 functions as a seal so as to restrict or to limit the amount of the compressed air 83 that may pass from the pressure plenum 66 through the gap 252 and between the inner dome connecting flange 57 and the inner cowl connecting flange 180 into the combustion chamber 62.

Figure 5:
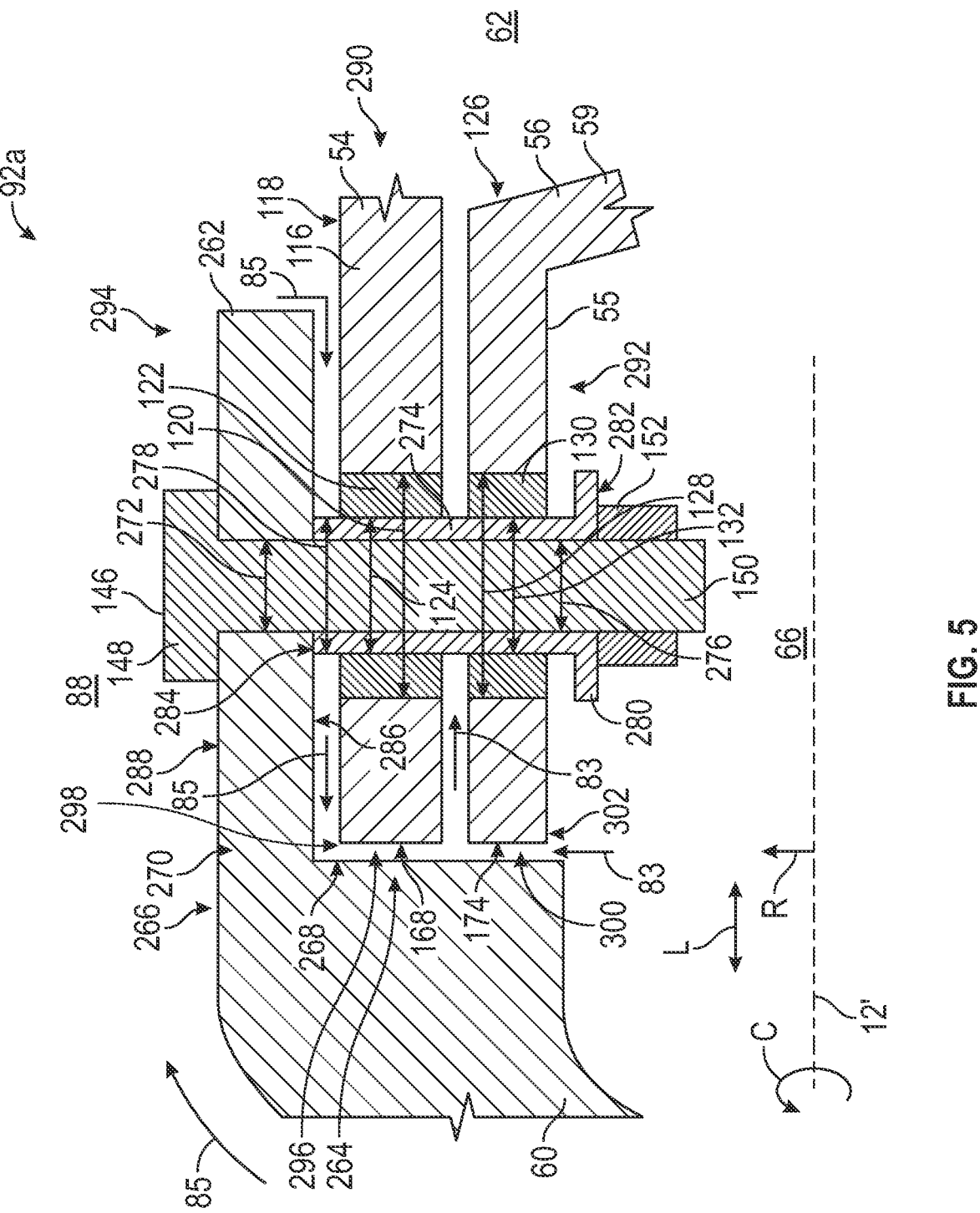
FIG. 5 depicts an alternate outer connection to that shown in FIG. 3, according to an aspect of the present disclosure.

FIG. 5 depicts an alternate outer connection 92a to that shown in FIG. 3, according to an aspect of the present disclosure. In FIG. 5, elements that are the same as those of the FIG. 3 aspect include the same reference numerals and the description of those elements provided above for the FIG. 3 aspect are equally applicable to the FIG. 5 aspect. In the FIG. 5 aspect, the cowl structure 60 includes a single yoke outer cowl connecting flange 262 that extends in the longitudinal direction L with respect to the combustor centerline axis 12' from an outer cowl flange root portion 264 of the cowl structure 60. In the FIG. 5 aspect, the outer cowl connecting flange 262 is generally arranged to extend from an outer portion 266 of the outer cowl flange root portion 264. The outer cowl flange root portion 264 includes an outer discourager wall portion 268 extending radially inward from an upstream end 270 of the outer cowl connecting flange 262. The outer cowl connecting flange 262 also includes an outer cowl connecting flange opening 272 therethrough.

The alternate outer connection 92a also includes an outer connection bushing 274 that has an opening 276 therethrough, has an outer diameter 278, and has a flange 280 arranged on an inner side 282 of the outer connection bushing 274. The outer diameter 278 of the outer connection bushing 274 is slightly less than the inner diameter of the outer liner connecting flange bushing opening 124, and slightly less than the inner diameter of the outer dome connecting flange bushing opening 132 so that the outer liner connecting flange bushing 122 and the outer dome connecting flange bushing 130 slidingly engage with the outer connection bushing 274. An outer side 284 of the outer connection bushing 274 is inserted through the outer dome connecting flange bushing opening 132, and through the outer liner connecting flange bushing opening 124 until the outer side 284 of the outer connection bushing 274 engages with an inner side 286 of the outer cowl connecting flange 262. The outer connection fastener 146 is implemented in the FIG. 5 aspect to form the alternate outer connection 92a by inserting the shank 150 of the outer connection fastener 146 through the outer cowl connecting flange opening 272 and through the opening 276 of the outer connection bushing 274. The retention member 152 is threadedly engaged with the shank 150 of the outer connection fastener 146 so that the head 148 of the outer connection fastener 146 engages with an outer side 288 of the outer cowl connecting flange 262 and so that the retention member 152 engages with the flange 280 of the outer connection bushing 274. The retention member 152 is torqued to tighten the connection.

The foregoing arrangement of FIG. 5, therefore, provides for an outer stacked arrangement 290 with respect to the radial direction R in which the outer dome connecting flange 55 is arranged on an inner side 292 of the outer stacked arrangement 290, the outer cowl connecting flange 262 is arranged on an outer side 294 of the outer stacked arrangement 290, and the outer liner connecting flange 116 is arranged between the outer dome connecting flange 55 and the outer cowl connecting flange 262.

In addition, the upstream end 168 of the outer liner connecting flange 116 is arranged adjacent to the outer discourager wall portion 268 with a gap 296 therebetween, such that, the upstream end 168 of the outer liner connecting flange 116 and the outer discourager wall portion 268 define an outer liner connecting flange discourager 298. The outer liner connecting flange discourager 298 functions as a seal so as to restrict or to limit the amount of the compressed air 85 that may pass from the outer flow passage 88 through the gap 296 and between the outer liner connecting flange 116 and the outer dome connecting flange 55 into the combustion chamber 62.

Similarly, the upstream end 174 of the outer dome connecting flange 55 is arranged adjacent to the outer discourager wall portion 268 with a gap 300 therebetween, such that, the upstream end 174 of the outer dome connecting flange 55 and the outer discourager wall portion 268 define an outer dome connecting flange discourager 302. The outer dome connecting flange discourager 302 functions as a seal so as to restrict or to limit the amount of the compressed air 83 that may pass from the pressure plenum 66 through the gap 300 and between the outer dome connecting flange 55 and the outer liner connecting flange 116 into the combustion chamber 62.

Figure 6:
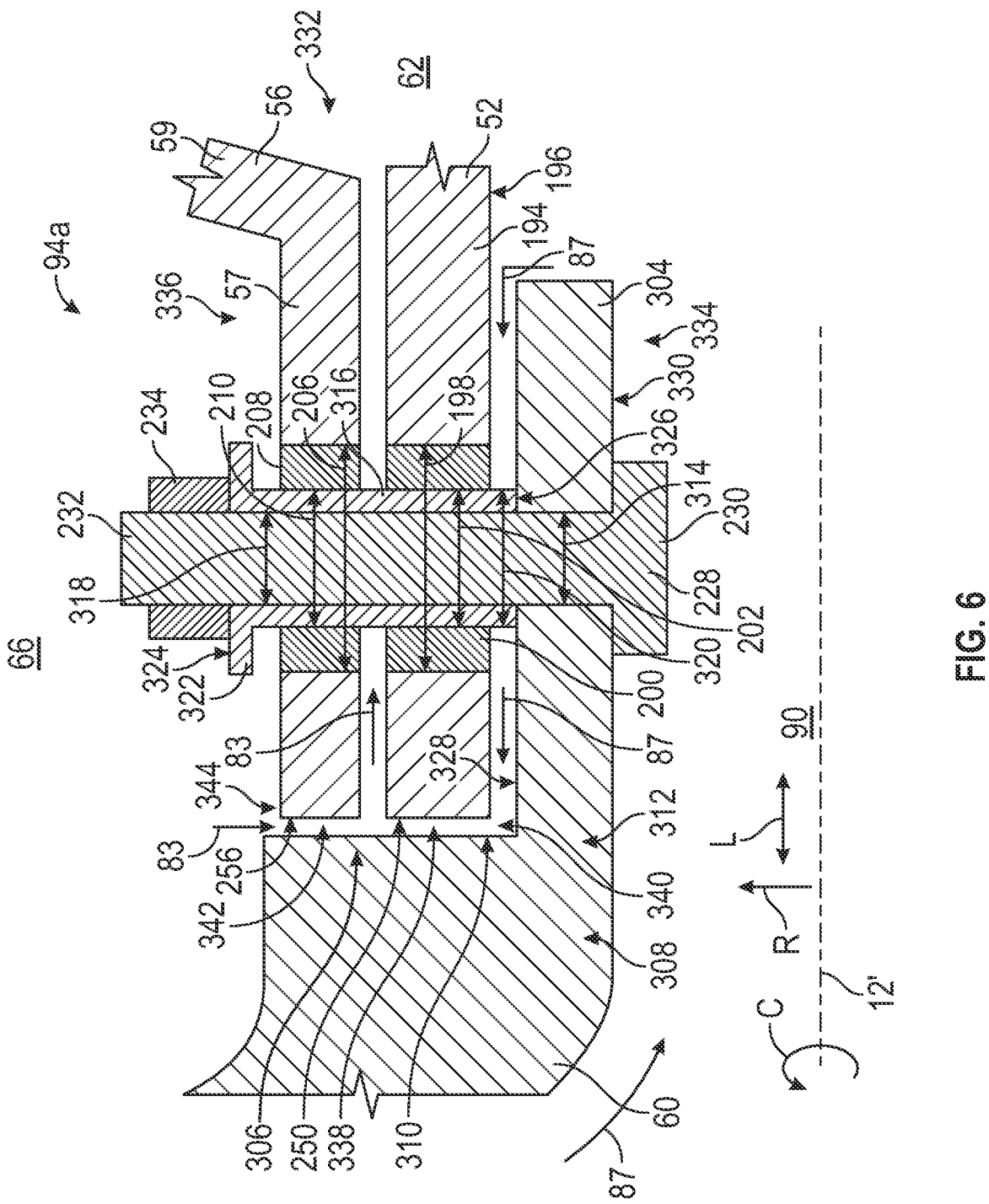
FIG. 6 depicts an alternate inner connection to that shown in FIG. 4, according to an aspect of the present disclosure.

FIG. 6 depicts an alternate inner connection 94a to that shown in FIG. 3, according to an aspect of the present disclosure. In FIG. 6, elements that are the same as those of the FIG. 4 aspect include the same reference numerals and the description of those elements provided above for the FIG. 4 aspect are equally applicable to the FIG. 6 aspect. In the FIG. 6 aspect, the cowl structure 60 includes a single yoke inner cowl connecting flange 304 that extends in the longitudinal direction L with respect to the combustor centerline axis 12' from an inner cowl flange root portion 306 of the cowl structure 60. In the FIG. 6 aspect, the inner cowl connecting flange 304 is generally arranged to extend from an inner portion 308 of the inner cowl flange root portion 306. The inner cowl flange root portion 306 includes an inner discourager wall portion 310 extending radially outward from an upstream end 312 of the inner cowl connecting flange 304. The inner cowl connecting flange 304 also includes an inner cowl connecting flange opening 314 therethrough.

The alternate inner connection 94a also includes an inner connection bushing 316 that has an opening 318 therethrough, has an outer diameter 320, and has a flange 322 arranged on an outer side 324 of the inner connection bushing 316. The outer diameter 320 of the inner connection bushing 316 is slightly less than the inner diameter of the inner liner connecting flange bushing opening 202, and slightly less than the inner diameter of the inner dome connecting flange bushing opening 210 so that the inner liner connecting flange bushing 200 and the inner dome connecting flange bushing 208 slidingly engage with the inner connection bushing 316. An inner side 326 of the inner connection bushing 316 is inserted through the inner dome connecting flange bushing opening 210, and through the inner liner connecting flange bushing opening 202 until the inner side 326 of the inner connection bushing 316 engages with an outer side 328 of the inner cowl connecting flange 304. The inner connection fastener 228 is implemented in the FIG. 6 aspect to form the alternate inner connection 94a by inserting the shank 232 of the inner connection fastener 228 through the inner cowl connecting flange opening 314 and through the opening 318 of the inner connection bushing 316. The retention member 234 is threadedly engaged with the shank 232 of the inner connection fastener 228 so that the head 230 of the inner connection fastener 228 engages with an inner side 330 of the inner cowl connecting flange 304 and so that the retention member 234 engages with the flange 322 of the inner connection bushing 316. The retention member 234 is torqued to tighten the connection.

The foregoing arrangement of FIG. 6, therefore, provides for an inner stacked arrangement 332 with respect to the radial direction R in which the inner cowl connecting flange 304 is arranged on an inner side 334 of the inner stacked arrangement 332, the inner dome connecting flange 57 is arranged on an outer side 336 of the inner stacked arrangement 332, and the inner liner connecting flange 194 is arranged between the inner cowl connecting flange 304 and the inner dome connecting flange 57.

In addition, the upstream end 250 of the inner liner connecting flange 194 is arranged adjacent to the inner discourager wall portion 310 with a gap 338 therebetween, such that, the upstream end 250 of the inner liner connecting flange 194 and the inner discourager wall portion 310 define an inner liner connecting flange discourager 340. The inner liner connecting flange discourager 340 functions as a seal so as to restrict or to limit the amount of the compressed air 87 that may pass from the inner flow passage 90 through the gap 338 and between the inner liner connecting flange 194 and the inner dome connecting flange 57 into the combustion chamber 62.

Similarly, the upstream end 256 of the inner dome connecting flange 57 is arranged adjacent to the inner discourager wall portion 310 with a gap 342 therebetween, such that, the upstream end 256 of the inner dome connecting flange 57 and the inner discourager wall portion 310 define an inner dome connecting flange discourager 344. The inner dome connecting flange discourager 344 functions as a seal so as to restrict or to limit the amount of the compressed air 83 that may pass from the pressure plenum 66 through the gap 342 and between the inner dome connecting flange 57 and the inner liner connecting flange 194 into the combustion chamber 62.

Figure 7:
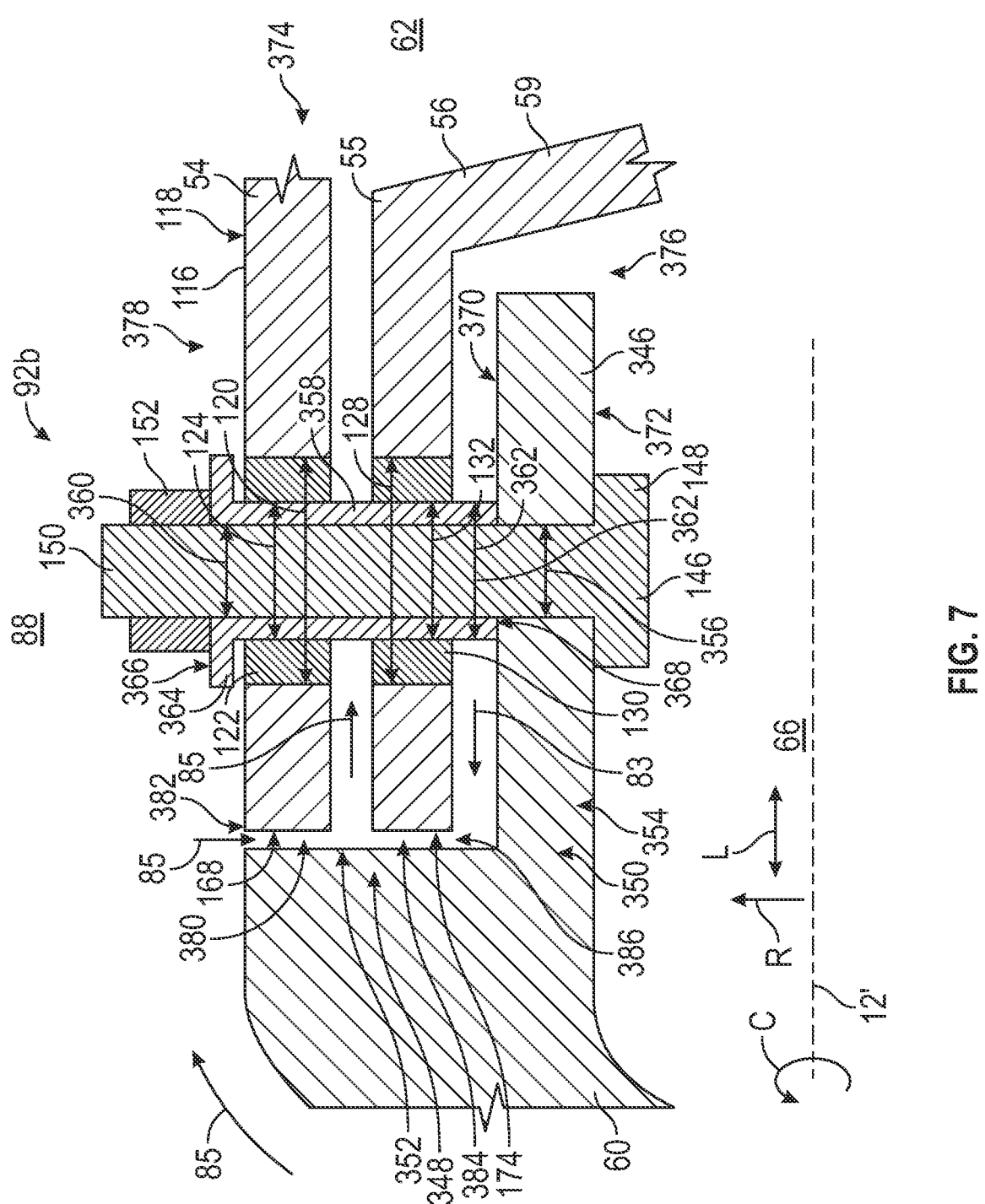
FIG. 7 depicts an alternate outer connection to that shown in FIG. 3, according to an aspect of the present disclosure.

FIG. 7 depicts an alternate outer connection 92b to that shown in FIG. 3, according to an aspect of the present disclosure. In FIG. 7, elements that are the same as those of the FIG. 3 aspect include the same reference numerals and the description of those elements provided above for the FIG. 3 aspect are equally applicable to the FIG. 7 aspect. In the FIG. 7 aspect, the cowl structure 60 includes a single yoke outer cowl connecting flange 346 that extends in the longitudinal direction L with respect to the combustor centerline axis 12' from an outer cowl flange root portion 348 of the cowl structure 60. In the FIG. 7 aspect, the outer cowl connecting flange 346 is generally arranged to extend from an inner portion 350 of the outer cowl flange root portion 348. The outer cowl flange root portion 348 includes an outer discourager wall portion 352 extending radially outward from an upstream end 354 of the outer cowl connecting flange 346. The outer cowl connecting flange 346 also includes an outer cowl connecting flange opening 356 therethrough.

The alternate outer connection 92b also includes an outer connection bushing 358 that has an opening 360 therethrough, has an outer diameter 362, and has a flange 364 arranged on an outer side 366 of the outer connection bushing 358. The outer diameter 362 of the outer connection bushing 358 is slightly less than the inner diameter of the outer liner connecting flange bushing opening 124, and slightly less than the inner diameter of the outer dome connecting flange bushing opening 132 so that the outer liner connecting flange bushing 122 and the outer dome connecting flange bushing 130 slidingly engage with the outer connection bushing 358. An inner side 368 of the outer connection bushing 358 is inserted through the outer liner connecting flange bushing opening 124 and through the outer dome connecting flange bushing opening 132 until the inner side 368 of the outer connection bushing 358 engages with an outer side 370 of the outer cowl connecting flange 346. The outer connection fastener 146 is implemented in the FIG. 7 aspect to form the alternate outer connection 92b by inserting the shank 150 of the outer connection fastener 146 through the outer cowl connecting flange opening 356 and through the opening 360 of the outer connection bushing 358. The retention member 152 is threadedly engaged with the shank 150 of the outer connection fastener 146 so that the head 148 of the outer connection fastener 146 engages with an inner side 372 of the outer cowl connecting flange 346 and so that the retention member 152 engages with the flange 364 of the outer connection bushing 358. The retention member 152 is torqued to tighten the connection.

The foregoing arrangement of FIG. 7, therefore, provides for an outer stacked arrangement 374 with respect to the radial direction R in which the outer cowl connecting flange 346 is arranged on an inner side 376 of the outer stacked arrangement 374, the outer liner connecting flange 116 is arranged on an outer side 378 of the outer stacked arrangement 374, and the inner dome connecting flange 55 is arranged between the outer cowl connecting flange 346 and the outer liner connecting flange 116.

In addition, the upstream end 168 of the outer liner connecting flange 116 is arranged adjacent to the outer discourager wall portion 352 with a gap 380 therebetween, such that, the upstream end 168 of the outer liner connecting flange 116 and the outer discourager wall portion 352 define an outer liner connecting flange discourager 382. The outer liner connecting flange discourager 382 functions as a seal so as to restrict or to limit the amount of the compressed air 85 that may pass from the outer flow passage 88 through the gap 380 and between the outer liner connecting flange 116 and the outer dome connecting flange 55 into the combustion chamber 62.

Similarly, the upstream end 174 of the outer dome connecting flange 55 is arranged adjacent to the outer discourager wall portion 352 with a gap 384 therebetween, such that, the upstream end 174 of the outer dome connecting flange 55 and the outer discourager wall portion 352 define an outer dome connecting flange discourager 386. The outer dome connecting flange discourager 386 functions as a seal so as to restrict or to limit the amount of the compressed air 83 that may pass from the pressure plenum 66 through the gap 384 and between the outer dome connecting flange 55 and the outer liner connecting flange 116 into the combustion chamber 62.

Figure 8:
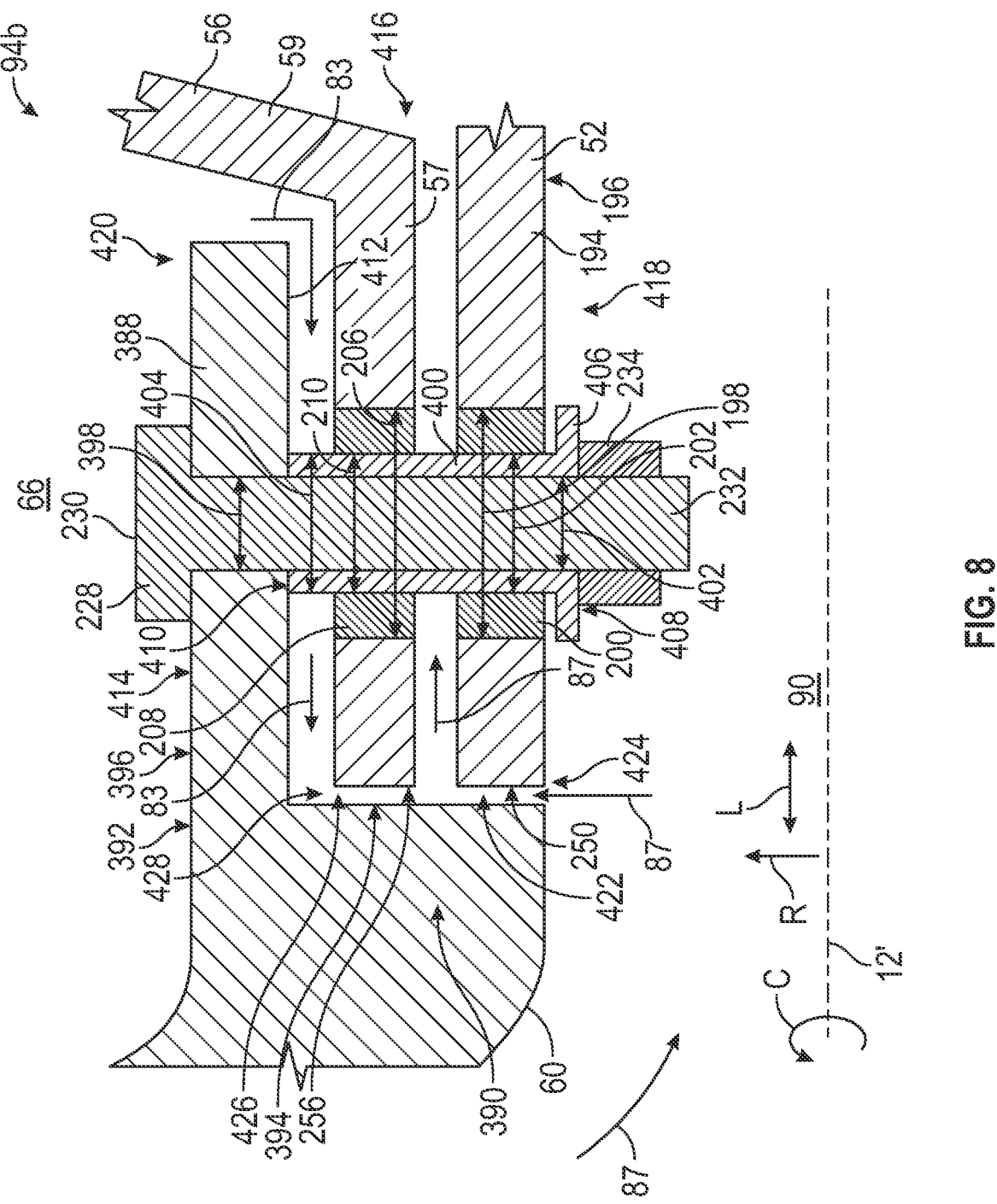
FIG. 8 depicts an alternate inner connection to that shown in FIG. 4, according to an aspect of the present disclosure.

FIG. 8 depicts an alternate inner connection 94b to that shown in FIG. 4, according to an aspect of the present disclosure. In FIG. 8, elements that are the same as those of the FIG. 4 aspect include the same reference numerals and the description of those elements provided above for the FIG. 4 aspect are equally applicable to the FIG. 8 aspect. In the FIG. 8 aspect, the cowl structure 60 includes a single yoke inner cowl connecting flange 388 that extends in the longitudinal direction L with respect to the combustor centerline axis 12' from an inner cowl flange root portion 390 of the cowl structure 60. In the FIG. 8 aspect, the inner cowl connecting flange 388 is generally arranged to extend from an outer portion 392 of the inner cowl flange root portion 390. The inner cowl flange root portion 390 includes an inner discourager wall portion 394 extending radially inward from an upstream end 396 of the inner cowl connecting flange 388. The inner cowl connecting flange 388 also includes an inner cowl connecting flange opening 398 therethrough.

The alternate inner connection 94*b* also includes an inner connection bushing 400 that has an opening 402 therethrough, has an outer diameter 404, and has a flange 406 arranged on an inner side 408 of the inner connection bushing 400. The outer diameter 404 of the inner connection bushing 400 is slightly less than the inner diameter of the inner liner connecting flange bushing opening 202, and slightly less than the inner diameter of the inner dome connecting flange bushing opening 210 so that the inner liner connecting flange bushing 200 and the inner dome connecting flange bushing 208 slidingly engage with the inner connection bushing 400. An outer side 410 of the inner connection bushing 400 is inserted through the inner liner connecting flange bushing opening 202 and through the inner dome connecting flange bushing opening 210 until the outer side 410 of the inner connection bushing 400 engages with an inner side 412 of the inner cowl connecting flange 388. The inner connection fastener 228 is implemented in the FIG. 8 aspect to form the alternate inner connection 94*b* by inserting the shank 232 of the inner connection fastener 228 through the inner cowl connecting flange opening 398 and through the opening 402 of the inner connection bushing 400. The retention member 234 is threadedly engaged with the shank 232 of the inner connection fastener 228 so that the head 230 of the inner connection fastener 228 engages with an outer side 414 of the inner cowl connecting flange 388 and so that the retention member 234 engages with the flange 406 of the inner connection bushing 400. The retention member 234 is torqued to tighten the connection.

The foregoing arrangement of FIG. 8, therefore, provides for an inner stacked arrangement 416 with respect to the radial direction R in which the inner liner connecting flange 194 is arranged on an inner side 418 of the inner stacked arrangement 416, the inner cowl connecting flange 388 is arranged on an outer side 420 of the inner stacked arrangement 416, and the inner dome connecting flange 57 is arranged between the inner liner connecting flange 194 and the inner cowl connecting flange 388.

In addition, the upstream end 250 of the inner liner connecting flange 194 is arranged adjacent to the inner discourager wall portion 394 with a gap 422 therebetween, such that, the upstream end 250 of the inner liner connecting flange 194 and the inner discourager wall portion 394 define an inner liner connecting flange discourager 424. The inner liner connecting flange discourager 424 functions as a seal so as to restrict or to limit the amount of the compressed air 87 that may pass from the inner flow passage 90 through the gap 422 and between the inner liner connecting flange 194 and the inner dome connecting flange 57 into the combustion chamber 62.

Similarly, the upstream end 256 of the inner dome connecting flange 57 is arranged adjacent to the inner discourager wall portion 394 with a gap 426 therebetween, such that, the upstream end 256 of the inner dome connecting flange 57 and the inner discourager wall portion 394 define an inner dome connecting flange discourager 428. The inner dome connecting flange discourager 428 functions as a seal so as to restrict or to limit the amount of the compressed air 83 that may pass from the pressure plenum 66 through the gap 426 and between the inner dome connecting flange 57 and the inner liner connecting flange 194 into the combustion chamber 62.

Figure 9:
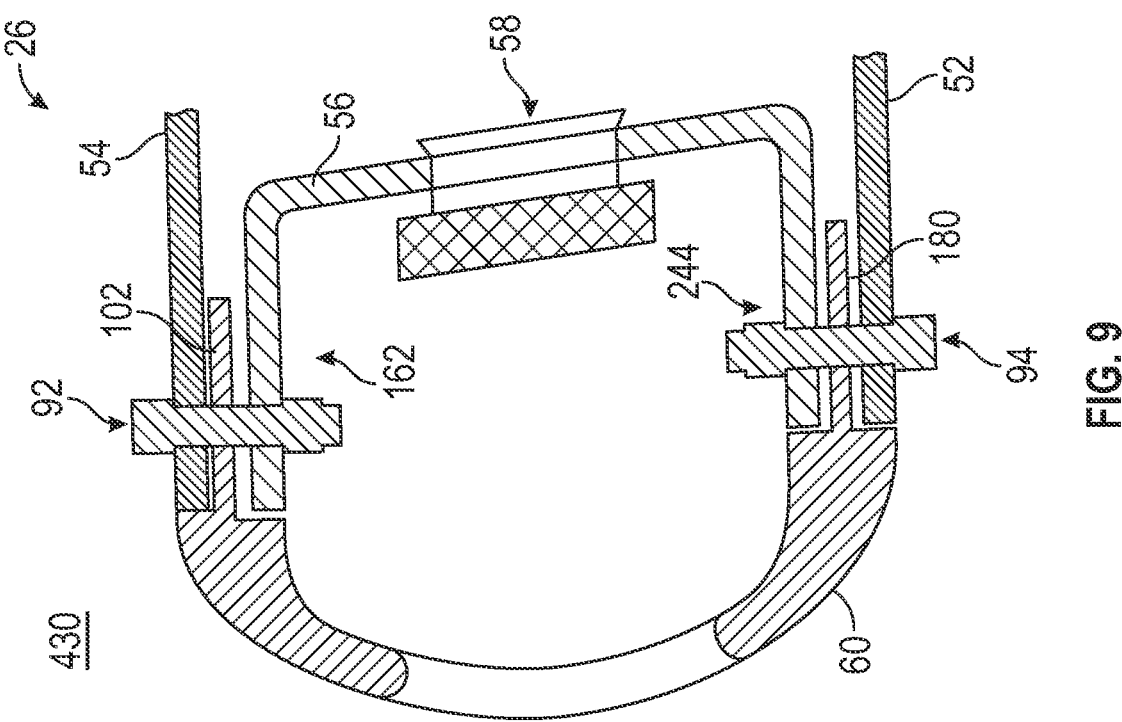
FIG. 9 is a partial cross-sectional view of a portion of the combustion section of FIG. 2, taken at detail view 430 of FIG. 2, according to an aspect of the present disclosure.

FIG. 9 through FIG. 17 depict various combinations of outer connections and inner connections for connecting the cowl structure 60, the CMC dome structure 56, the CMC outer liner 54, and the CMC inner liner 52 in the combustion section 26. In FIG. 9 through FIG. 17, the swirler assembly 58 is shown generally as compared to the swirler assembly 58 shown in FIG. 2, and the fuel nozzle assembly 70 has been removed merely to provide better clarity of the remaining structure. FIG. 9 is a partial cross-sectional view of a portion of the combustion section 26 of FIG. 2, taken at detail view 430 of FIG. 2, according to an aspect of the present disclosure. In FIG. 9, the cowl structure 60 includes the outer cowl connecting flange 102 and the inner cowl connecting flange 180. The cowl structure 60, the CMC dome structure 56, the CMC outer liner 54, and the CMC inner liner 52 are connected together via the outer connection 92 and via the inner connection 94. The outer connection 92 corresponds to the FIG. 3 aspect, and the inner connection 94 corresponds to the FIG. 4 aspect. Thus, the outer connection 92 includes the outer stacked arrangement 162 (FIG. 3), and the inner connection 94 includes the inner stacked arrangement 244 (FIG. 4).

Figure 10:
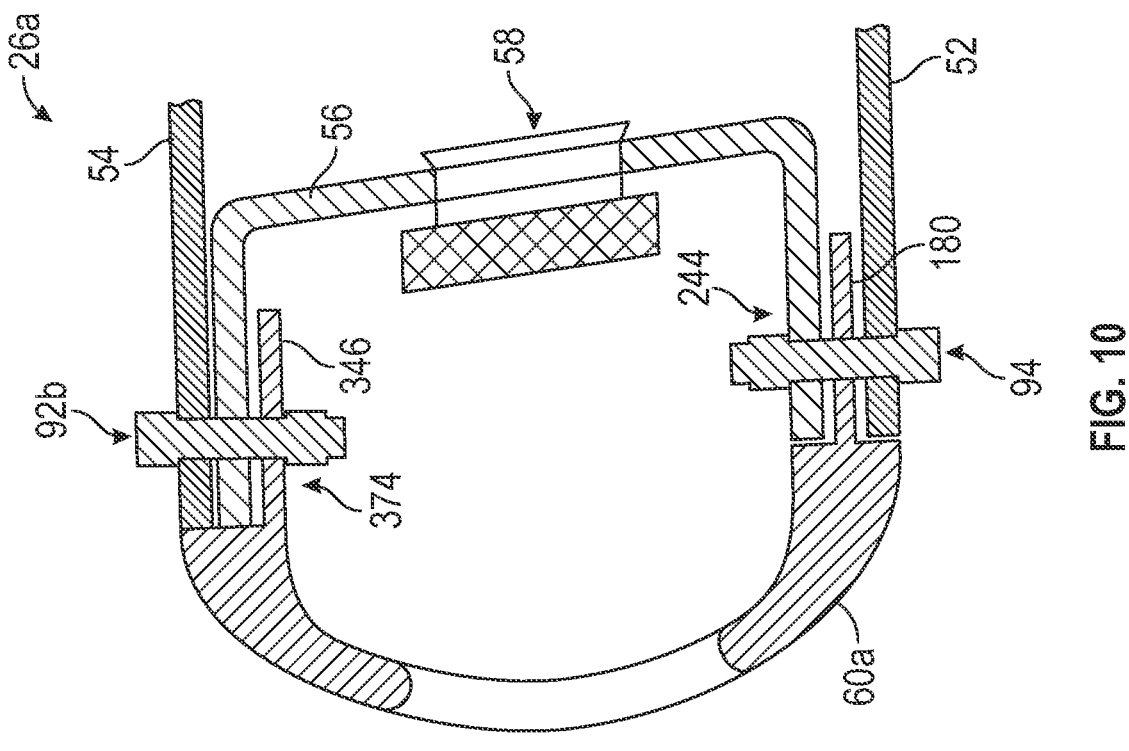
FIG. 10 depicts an arrangement of an alternate combustion section to that shown in FIG. 9, according to an aspect of the present disclosure.

FIG. 10 depicts an arrangement of an alternate combustion section 26*a* to that shown in FIG. 9, according to an aspect of the present disclosure. In FIG. 10, an alternate cowl structure 60*a* includes the outer cowl connecting flange 346 and the inner cowl connecting flange 180. The alternate cowl structure 60*a*, the CMC dome structure 56, the CMC outer liner 54, and the CMC inner liner 52 are connected together via the outer connection 92*b* and via the inner connection 94. The outer connection 92*b* corresponds to the FIG. 7 aspect, and the inner connection 94 corresponds to the FIG. 4 aspect. Thus, the outer connection 92*b* includes the outer stacked arrangement 374 (FIG. 7), and the inner connection 94 includes the inner stacked arrangement 244 (FIG. 4).

Figure 11:
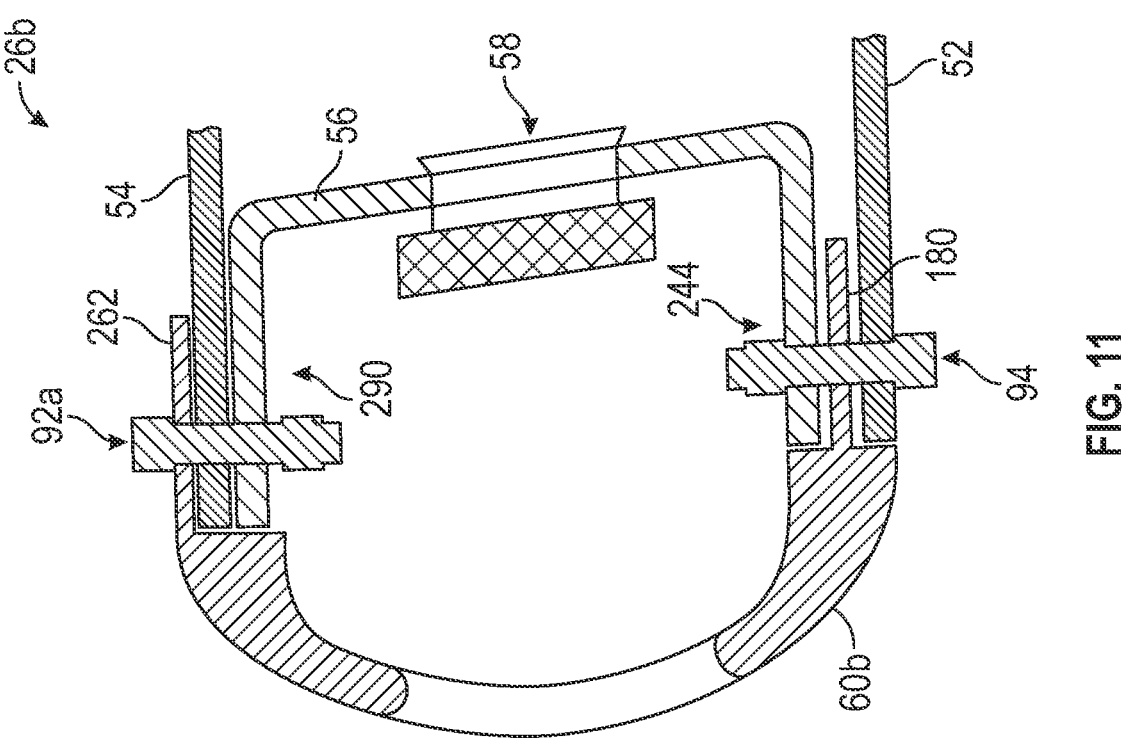
FIG. 11 depicts an arrangement of an alternate combustion section to that shown in FIG. 9, according to an aspect of the present disclosure.

FIG. 11 depicts an arrangement of an alternate combustion section 26*b* to that shown in FIG. 9, according to an aspect of the present disclosure. In FIG. 11, an alternate cowl structure 60*b* includes the outer cowl connecting flange 262 and the inner cowl connecting flange 180. The alternate cowl structure 60*b*, the CMC dome structure 56, the CMC outer liner 54, and the CMC inner liner 52 are connected together via the outer connection 92*a* and via the inner connection 94. The outer connection 92*a* corresponds to the FIG. 5 aspect, and the inner connection 94 corresponds to the FIG. 4 aspect. Thus, the outer connection 92*a* includes the outer stacked arrangement 290 (FIG. 5), and the inner connection 94 includes the inner stacked arrangement 244 (FIG. 4).

Figure 12:
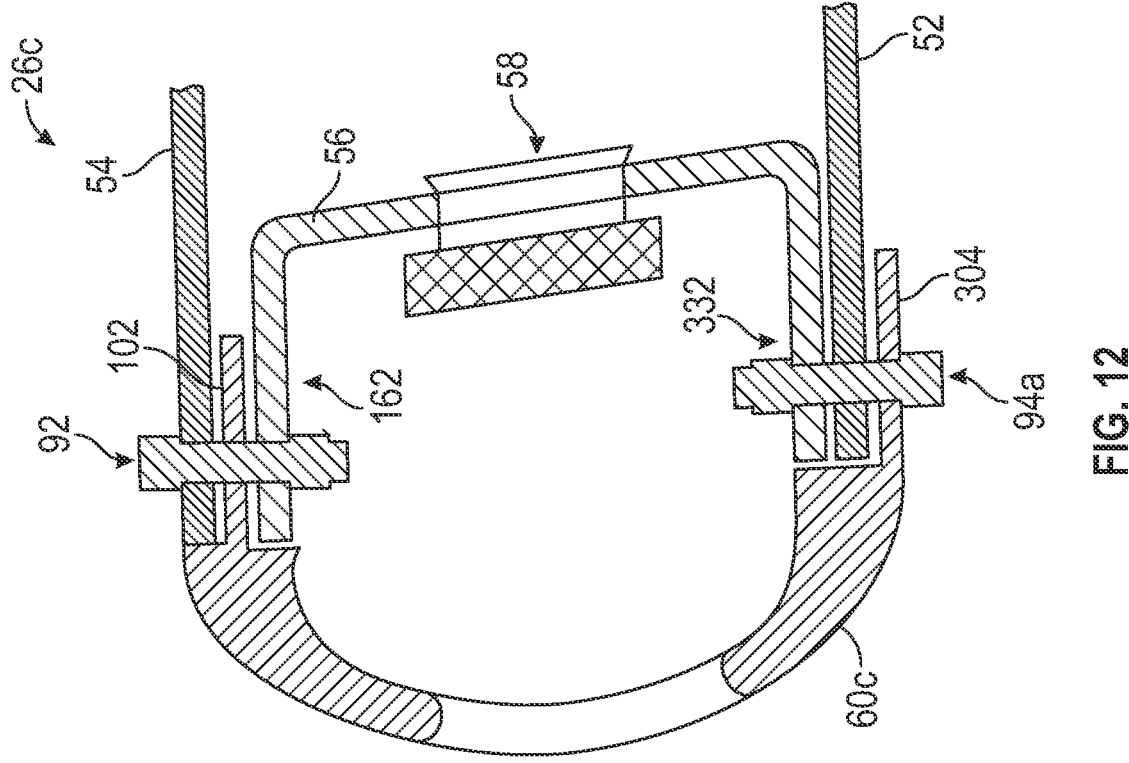
FIG. 12 depicts an arrangement of an alternate combustion section to that shown in FIG. 9, according to an aspect of the present disclosure.

FIG. 12 depicts an arrangement of an alternate combustion section 26*c* to that shown in FIG. 9, according to an aspect of the present disclosure. In FIG. 12, an alternate cowl structure 60*c* includes the outer cowl connecting flange 102 and the inner cowl connecting flange 304. The alternate cowl structure 60*c*, the CMC dome structure 56, the CMC outer liner 54, and the CMC inner liner 52 are connected together via the outer connection 92 and via the inner connection 94*a*. The outer connection 92 corresponds to the FIG. 3 aspect, and the inner connection 94*a* corresponds to the FIG. 6 aspect. Thus, the outer connection 92 includes the outer stacked arrangement 162 (FIG. 3), and the inner connection 94*a* includes the inner stacked arrangement 332 (FIG. 6).

Figure 13:
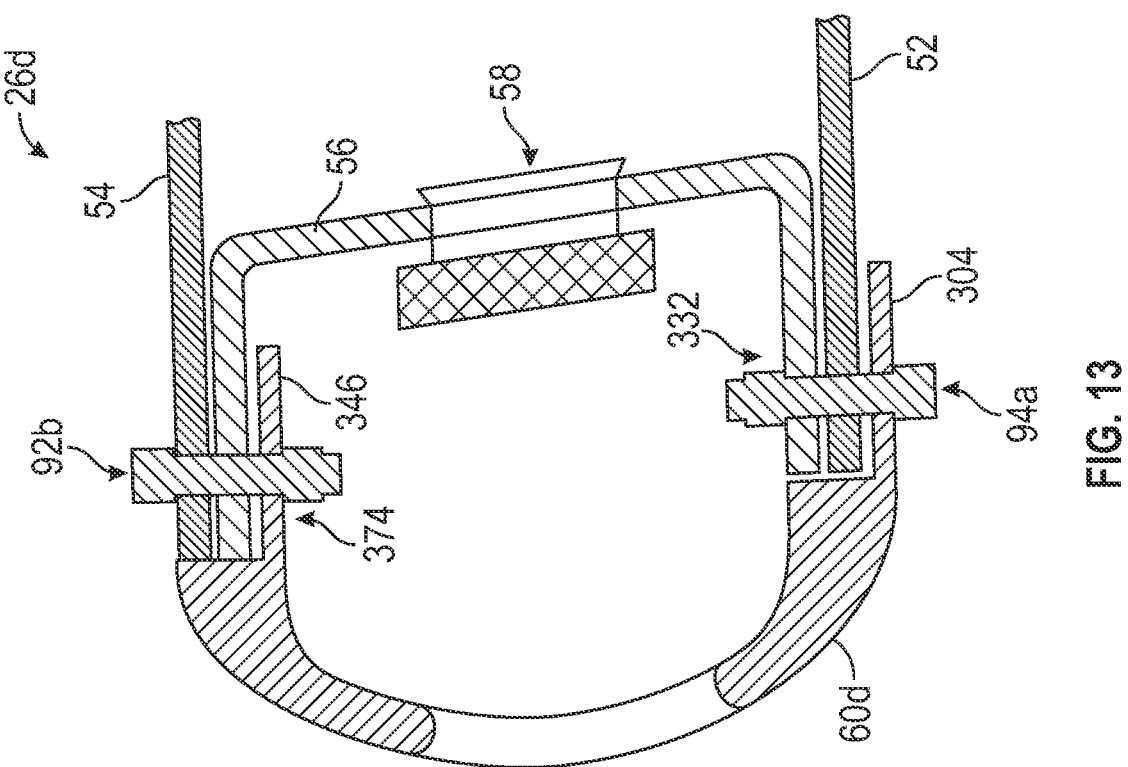
FIG. 13 depicts an arrangement of an alternate combustion section to that shown in FIG. 9, according to an aspect of the present disclosure.

FIG. 13 depicts an arrangement of an alternate combustion section 26*d* to that shown in FIG. 9, according to an aspect of the present disclosure. In FIG. 13, an alternate cowl structure 60*d* includes the outer cowl connecting flange 346 and the inner cowl connecting flange 304. The alternate cowl structure 60d, the CMC dome structure 56, the CMC outer liner 54, and the CMC inner liner 52 are connected together via the outer connection 92b and via the inner connection 94a. The outer connection 92b corresponds to the FIG. 7 aspect, and the inner connection 94a corresponds to the FIG. 6 aspect. Thus, the outer connection 92b includes the outer stacked arrangement 374 (FIG. 7), and the inner connection 94a includes the inner stacked arrangement 332 (FIG. 6).

Figure 14:
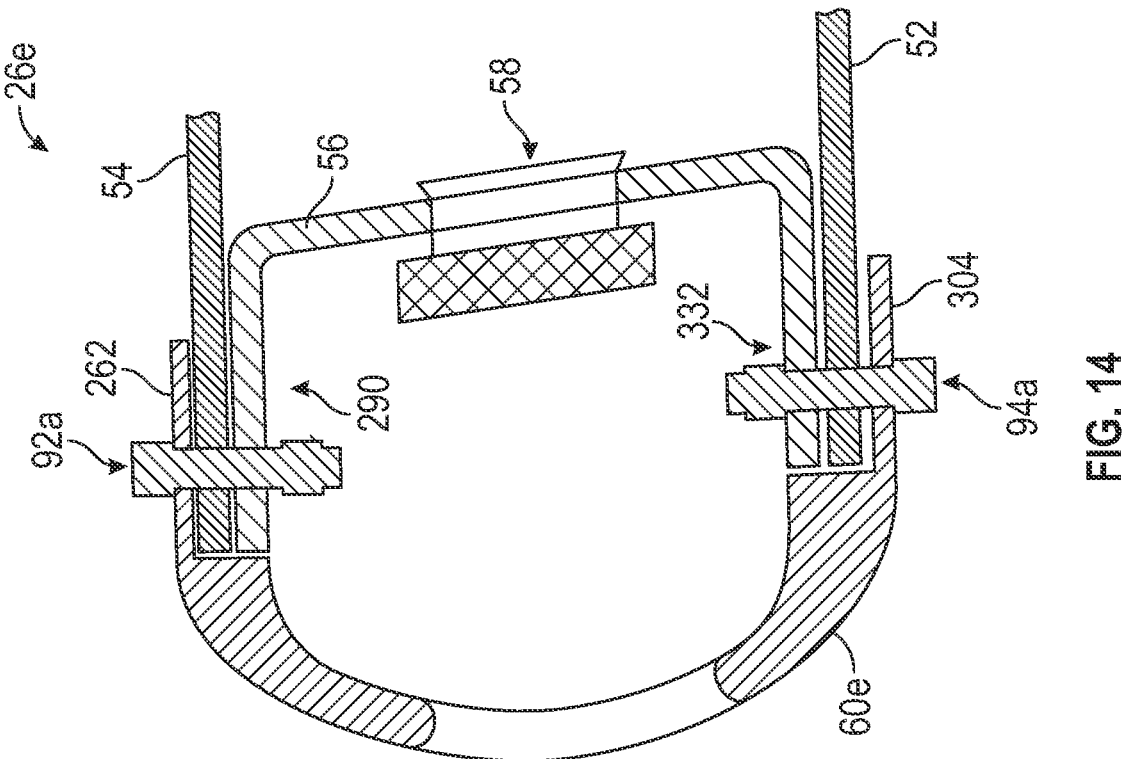
FIG. 14 depicts an arrangement of an alternate combustion section to that shown in FIG. 9, according to an aspect of the present disclosure.

FIG. 14 depicts an arrangement of an alternate combustion section 26e to that shown in FIG. 9, according to an aspect of the present disclosure. In FIG. 14, an alternate cowl structure 60e includes the outer cowl connecting flange 262 and the inner cowl connecting flange 304. The alternate cowl structure 60e, the CMC dome structure 56, the CMC outer liner 54, and the CMC inner liner 52 are connected together via the outer connection 92a and via the inner connection 94a. The outer connection 92a corresponds to the FIG. 5 aspect, and the inner connection 94a corresponds to the FIG. 6 aspect. Thus, the outer connection 92a includes the outer stacked arrangement 290 (FIG. 5), and the inner connection 94 includes the inner stacked arrangement 332 (FIG. 6).

Figure 15:
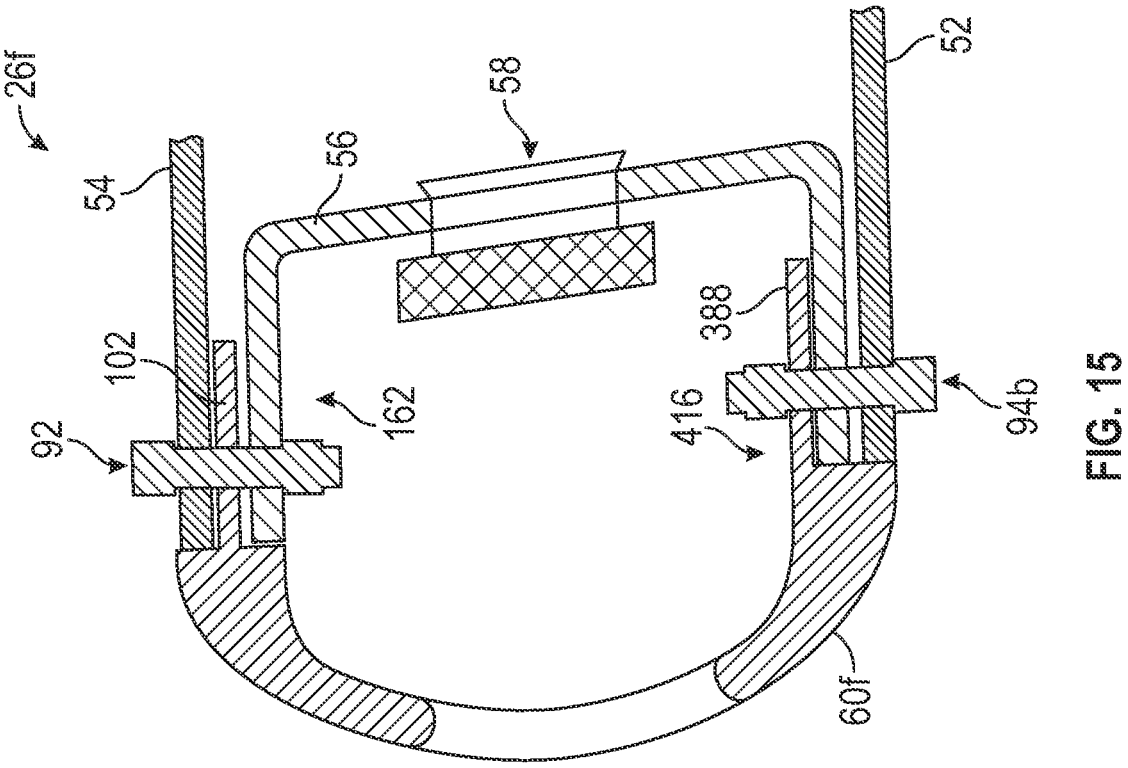
FIG. 15 depicts an arrangement of an alternate combustion section to that shown in FIG. 9, according to an aspect of the present disclosure.

FIG. 15 depicts an arrangement of an alternate combustion section 26f to that shown in FIG. 9, according to an aspect of the present disclosure. In FIG. 15, an alternate cowl structure 60f includes the outer cowl connecting flange 102 and the inner cowl connecting flange 388. The alternate cowl structure 60f, the CMC dome structure 56, the CMC outer liner 54, and the CMC inner liner 52 are connected together via the outer connection 92 and via the inner connection 94b. The outer connection 92 corresponds to the FIG. 3 aspect, and the inner connection 94b corresponds to the FIG. 8 aspect. Thus, the outer connection 92 includes the outer stacked arrangement 162 (FIG. 3), and the inner connection 94b includes the inner stacked arrangement 416 (FIG. 8).

Figure 16:
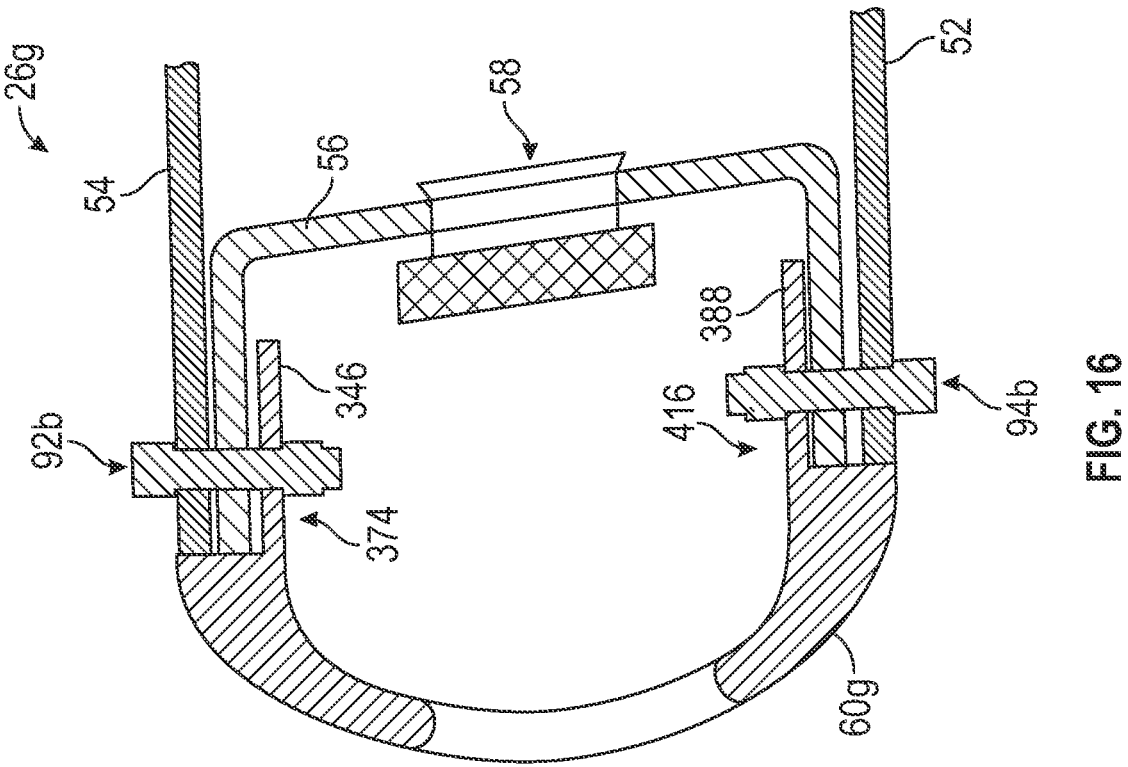
FIG. 16 depicts an arrangement of an alternate combustion section to that shown in FIG. 9, according to an aspect of the present disclosure.

FIG. 16 depicts an arrangement of an alternate combustion section 26g to that shown in FIG. 9, according to an aspect of the present disclosure. In FIG. 10, an alternate cowl structure 60g includes the outer cowl connecting flange 346 and the inner cowl connecting flange 388. The alternate cowl structure 60g, the CMC dome structure 56, the CMC outer liner 54, and the CMC inner liner 52 are connected together via the outer connection 92b and via the inner connection 94b. The outer connection 92b corresponds to the FIG. 7 aspect, and the inner connection 94b corresponds to the FIG. 8 aspect. Thus, the outer connection 92b includes the outer stacked arrangement 374 (FIG. 7), and the inner connection 94b includes the inner stacked arrangement 416 (FIG. 8).

Figure 17:
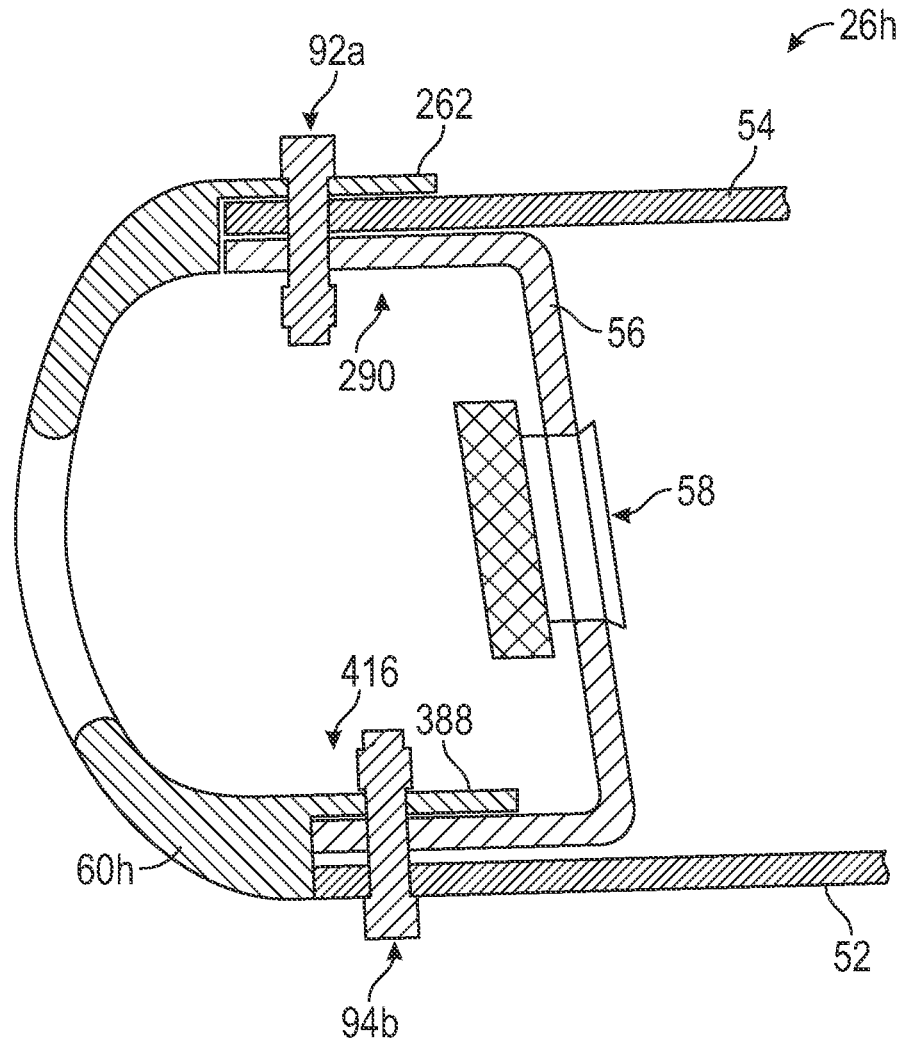
FIG. 17 depicts an arrangement of an alternate combustion section to that shown in FIG. 9, according to an aspect of the present disclosure.

FIG. 17 depicts an arrangement of an alternate combustion section 26h to that shown in FIG. 9, according to an aspect of the present disclosure. In FIG. 17, an alternate cowl structure 60h includes the outer cowl connecting flange 262 and the inner cowl connecting flange 388. The alternate cowl structure 60h, the CMC dome structure 56, the CMC outer liner 54, and the CMC inner liner 52 are connected together via the outer connection 92a and via the inner connection 94b. The outer connection 92a corresponds to the FIG. 5 aspect, and the inner connection 94b corresponds to the FIG. 8 aspect. Thus, the outer connection 92a includes the outer stacked arrangement 290 (FIG. 5), and the inner connection 94b includes the inner stacked arrangement 416 (FIG. 8).

The foregoing aspects provide different, but similar, techniques for connecting a CMC dome structure and CMC liners to a metallic cowl structure within a combustion section of a gas turbine engine. The inclusion of the single yoke connecting flange, on both the outer side and the inner side of the metallic cowl structure, provides the ability to achieve the various connection arrangements, which could not be achieved with the conventional double yoke (or clevis-type) of cowl connecting flanges. The reduction in the number of connection flanges on the metallic cowl structure also reduces the overall weight of the combustor, and also reduces the radial height of the combustion section at the connections.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A combustor for a gas turbine engine, the combustor including a ceramic matrix longitudinal direction with respect to a combustor centerline axis from an outer side of a dome plate, and an inner dome connecting flange extending in the longitudinal direction from an inner side of the dome plate, a cowl structure including a single yoke outer cowl connecting flange extending in the longitudinal direction from an outer cowl flange root portion of the cowl structure, and a single yoke inner cowl connecting flange extending in the longitudinal direction from an inner cowl flange root portion of the cowl structure, a CMC outer liner including an outer liner connecting flange extending in the longitudinal direction at an upstream end of the CMC outer liner, a CMC inner liner including an inner liner connecting flange extending in the longitudinal direction, an outer connection connecting the outer dome connecting flange, the outer cowl connecting flange, and the outer liner connecting flange in an outer stacked arrangement with respect to a radial direction extending outward from the combustor centerline axis, and an inner connection connecting the inner dome connecting flange, the inner cowl connecting flange, and the inner liner connecting flange in an inner stacked arrangement extending in the radial direction.

The combustor according to the preceding clause, wherein the outer stacked arrangement comprises the outer dome connecting flange arranged on an inner side of the outer stacked arrangement, the outer liner connecting flange arranged on an outer side of the outer stacked arrangement, and the outer cowl connecting flange arranged between the outer dome connecting flange and the outer liner connecting flange, and the inner stacked arrangement comprises the inner liner connecting flange arranged on an inner side of the inner stacked arrangement, the inner dome connecting flange arranged on an outer side of the inner stacked arrangement, and the inner cowl connecting flange arranged between the inner liner connecting flange and the inner dome connecting flange.

The combustor according to any preceding clause, wherein the outer stacked arrangement comprises the outer cowl connecting flange arranged on an inner side of the outer stacked arrangement, the outer liner connecting flange arranged on an outer side of the outer stacked arrangement, and the outer dome connecting flange arranged between the outer cowl connecting flange and the outer liner connecting flange, and the inner stacked arrangement comprises the inner liner connecting flange arranged on an inner side of the inner stacked arrangement, the inner dome connecting flange arranged on an outer side of the inner stacked arrangement, and the inner cowl connecting flange arranged between the inner liner connecting flange and the inner dome connecting flange.

The combustor according to any preceding clause, wherein the outer stacked arrangement comprises the outer dome connecting flange arranged on an inner side of the outer stacked arrangement, the outer cowl connecting flange arranged on an outer side of the outer stacked arrangement, and the outer liner connecting flange arranged between the outer dome connecting flange and the outer cowl connecting flange, and the inner stacked arrangement comprises the inner liner connecting flange arranged on an inner side of the inner stacked arrangement, the inner dome connecting flange arranged on an outer side of the inner stacked arrangement, and the inner cowl connecting flange arranged between the inner liner connecting flange and the inner dome connecting flange.

The combustor according to any preceding clause, wherein the outer stacked arrangement comprises the outer dome connecting flange arranged on an inner side of the outer stacked arrangement, the outer liner connecting flange arranged on an outer side of the outer stacked arrangement, and the outer cowl connecting flange arranged between the outer dome connecting flange and the outer liner connecting flange, and the inner stacked arrangement comprises the inner cowl connecting flange arranged on an inner side of the inner stacked arrangement, the inner dome connecting flange arranged on an outer side of the inner stacked arrangement, and the inner liner connecting flange arranged between the inner cowl connecting flange and the inner dome connecting flange.

The combustor according to any preceding clause, wherein the outer stacked arrangement comprises the outer cowl connecting flange arranged on an inner side of the outer stacked arrangement, the outer liner connecting flange arranged on an outer side of the outer stacked arrangement, and the outer dome connecting flange arranged between the outer cowl connecting flange and the outer liner connecting flange, and the inner stacked arrangement comprises the inner cowl connecting flange arranged on an inner side of the inner stacked arrangement, the inner dome connecting flange arranged on an outer side of the inner stacked arrangement, and the inner liner connecting flange arranged between the inner cowl connecting flange and the inner dome connecting flange.

The combustor according to any preceding clause, wherein the outer stacked arrangement comprises the outer dome connecting flange arranged on an inner side of the outer stacked arrangement, the outer cowl connecting flange arranged on an outer side of the outer stacked arrangement, and the outer liner connecting flange arranged between the outer dome connecting flange and the outer cowl connecting flange, and the inner stacked arrangement comprises the inner cowl connecting flange arranged on an inner side of the inner stacked arrangement, the inner dome connecting flange arranged on an outer side of the inner stacked arrangement, and the inner liner connecting flange arranged between the inner cowl connecting flange and the inner dome connecting flange.

The combustor according to any preceding clause, wherein the outer stacked arrangement comprises the outer dome connecting flange arranged on an inner side of the outer stacked arrangement, the outer liner connecting flange arranged on an outer side of the outer stacked arrangement, and the outer cowl connecting flange arranged between the outer dome connecting flange and the outer liner connecting flange, and the inner stacked arrangement comprises the inner liner connecting flange arranged on an inner side of the inner stacked arrangement, the inner cowl connecting flange arranged on an outer side of the inner stacked arrangement, and the inner dome connecting flange arranged between the inner liner connecting flange and the inner cowl connecting flange.

The combustor according to any preceding clause, wherein the outer stacked arrangement comprises the outer cowl connecting flange arranged on an inner side of the outer stacked arrangement, the outer liner connecting flange arranged on an outer side of the outer stacked arrangement, and the outer dome connecting flange arranged between the outer cowl connecting flange and the outer liner connecting flange, and the inner stacked arrangement comprises the inner liner connecting flange arranged on an inner side of the inner stacked arrangement, the inner cowl connecting flange arranged on an outer side of the inner stacked arrangement, and the inner dome connecting flange arranged between the inner liner connecting flange and the inner cowl connecting flange.

The combustor according to any preceding clause, wherein the outer stacked arrangement comprises the outer dome connecting flange arranged on an inner side of the outer stacked arrangement, the outer cowl connecting flange arranged on an outer side of the outer stacked arrangement, and the outer liner connecting flange arranged between the outer dome connecting flange and the outer cowl connecting flange, and the inner stacked arrangement comprises the inner liner connecting flange arranged on an inner side of the inner stacked arrangement, the inner cowl connecting flange arranged on an outer side of the inner stacked arrangement, and the inner dome connecting flange arranged between the inner liner connecting flange and the inner cowl connecting flange.

The combustor according to any preceding clause, wherein the outer cowl flange root portion includes an outer discourager wall portion extending radially inward from an upstream end of the outer cowl connecting flange, an upstream end of the outer liner connecting flange is arranged adjacent to the outer discourager wall portion to define an outer liner connecting flange discourager, and an upstream end of the outer dome connecting flange is arranged adjacent to the outer discourager wall portion to define an outer dome connecting flange discourager.

The combustor according to any preceding clause, wherein the outer cowl flange root portion includes an outer discourager wall portion extending radially outward from an upstream end of the outer cowl connecting flange, an upstream end of the outer liner connecting flange is arranged adjacent to the outer discourager wall portion to define an outer liner connecting flange discourager, and an upstream end of the outer dome connecting flange is arranged adjacent to the outer discourager wall portion to define an outer dome connecting flange discourager.

The combustor according to any preceding clause, wherein the inner cowl flange root portion includes an inner discourager wall portion extending radially inward from an upstream end of the inner cowl connecting flange, an upstream end of the inner liner connecting flange is arranged adjacent to the inner discourager wall portion to define an inner liner connecting flange discourager, and an upstream end of the inner dome connecting flange is arranged adjacent to the inner discourager wall portion to define an inner dome connecting flange discourager.

The combustor according to any preceding clause, wherein the inner cowl flange root portion includes an inner discourager wall portion extending radially outward from an upstream end of the inner cowl connecting flange, an upstream end of the inner liner connecting flange is arranged adjacent to the inner discourager wall portion to define an inner liner connecting flange discourager, and an upstream end of the inner dome connecting flange is arranged adjacent to the inner discourager wall portion to define an inner dome connecting flange discourager.

The combustor according to any preceding clause, wherein the outer connection comprises at least one outer connection bushing extending through at least one of the outer liner connecting flange and the outer dome connecting flange, an outer connection fastener extending through the at least one outer connection bushing, and a retention member connected to the outer connection fastener.

The combustor according to any preceding clause, wherein the at least one outer connection bushing includes a first outer connection bushing and a second outer connection bushing.

The combustor according to any preceding clause, wherein an inner side of the first outer connection bushing is in contact with an outer side of the outer cowl connecting flange, an outer side of the first outer connection bushing is in contact with a head of the outer connection fastener, an outer side of the second outer connection bushing is in contact with an inner side of the outer cowl connecting flange, and an inner side of the second outer connection bushing is in contact with a retention member.

The combustor according to any preceding clause, wherein the at least one inner connection bushing includes a first inner connection bushing and a second inner connection bushing.

The combustor according to any preceding clause, wherein an inner side of the first inner connection bushing is in contact with an outer side of the inner cowl connecting flange, an outer side of the first inner connection bushing is in contact with a retention member, an outer side of the second outer connection bushing is in contact with an inner side of the inner cowl connecting flange, and an inner side of the second outer connection bushing is in contact with a head of the inner connection fastener.

The combustor according to any preceding clause, wherein the at least one outer connection bushing comprises an outer connection bushing extending through both the outer dome connecting flange and the through the outer liner connecting flange, an outer side of the outer connection bushing engaging with an inner side of the outer cowl connecting flange, and an inner side of the outer connection bushing engaging with one of a head of an outer connection fastener or with a retention member.

The combustor according to any preceding clause, wherein the at least one inner connection bushing comprises an inner connection bushing extending through both the inner dome connecting flange and the through the inner liner connecting flange, an inner side of the inner connection bushing engaging with an outer side of the inner cowl connecting flange, and an outer side of the inner connection bushing engaging with one of a head of an inner connection fastener or with a retention member.

The combustor according to any preceding clause, wherein the inner connection comprises at least one inner connection bushing extending through at least one of the inner liner connecting flange and the inner dome connecting flange, an inner connection fastener extending through the at least one inner connection bushing, and a retention member connected to the inner connection fastener.

The combustor according to any preceding clause, wherein the outer cowl flange root portion includes a first outer discourager wall portion extending radially outward from an upstream end of the outer cowl connecting flange, and a second outer discourager wall portion extending radially inward from the upstream end of the outer cowl connecting flange.

The combustor according to any preceding clause, wherein an upstream end of the outer liner connecting flange is arranged adjacent to the first outer discourager wall portion to define an outer liner connecting flange discourager, and an upstream end of the outer dome connecting flange is arranged adjacent to the second outer discourager wall portion to define an outer dome connecting flange discourager.

The combustor according to any preceding clause, wherein the inner cowl flange root portion includes a first inner discourager wall portion extending radially outward from an upstream end of the inner cowl connecting flange, and a second inner discourager wall portion extending radially inward from the upstream end of the inner cowl connecting flange.

The combustor according to any preceding clause, wherein an upstream end of the inner liner connecting flange is arranged adjacent to the second inner discourager wall portion to define an inner liner connecting flange discourager, and an upstream end of the inner dome connecting flange is arranged adjacent to the first inner discourager wall portion to define an inner dome connecting flange discourager.

A combustor for a gas turbine engine, the combustor including a ceramic matrix composite (CMC) dome structure including an outer dome connecting flange extending in a longitudinal direction with respect to a combustor centerline axis from an outer side of a dome plate, and an inner dome connecting flange extending in the longitudinal direction from an inner side of the dome plate, a cowl structure including a single yoke outer cowl connecting flange extending in the longitudinal direction from an outer cowl flange root portion of the cowl structure, and a single yoke inner cowl connecting flange extending in the longitudinal direction from an inner cowl flange root portion of the cowl structure, a CMC outer liner including an outer liner connecting flange extending in the longitudinal direction at an upstream end of the CMC outer liner, a CMC inner liner including an inner liner connecting flange extending in the longitudinal direction, an outer connection connecting the outer dome connecting flange, the outer cowl connecting flange, and the outer liner connecting flange in an outer stacked arrangement with respect to a radial direction extending outward from the combustor centerline axis, and an inner connection connecting the inner dome connecting flange, the inner cowl connecting flange, and the inner liner connecting flange in an inner stacked arrangement extending in the radial direction, wherein the outer stacked arrangement comprises the outer dome connecting flange arranged on an inner side of the outer stacked arrangement, the outer liner connecting flange arranged on an outer side of the outer stacked arrangement, and the outer cowl connecting flange arranged between the outer dome connecting flange and the outer liner connecting flange, and the inner stacked arrangement comprises the inner liner connecting flange arranged on an inner side of the inner stacked arrangement, the inner dome connecting flange arranged on an outer side of the inner stacked arrangement, and the inner cowl connecting flange arranged between the inner liner connecting flange and the inner dome connecting flange.

A combustor for a gas turbine engine, the combustor including a ceramic matrix composite (CMC) dome structure including an outer dome connecting flange extending in a longitudinal direction with respect to a combustor centerline axis from an outer side of a dome plate, and an inner dome connecting flange extending in the longitudinal direction from an inner side of the dome plate, a cowl structure including a single yoke outer cowl connecting flange extending in the longitudinal direction from an outer cowl flange root portion of the cowl structure, and a single yoke inner cowl connecting flange extending in the longitudinal direction from an inner cowl flange root portion of the cowl structure, a CMC outer liner including an outer liner connecting flange extending in the longitudinal direction at an upstream end of the CMC outer liner, a CMC inner liner including an inner liner connecting flange extending in the longitudinal direction, an outer connection connecting the outer dome connecting flange, the outer cowl connecting flange, and the outer liner connecting flange in an outer stacked arrangement with respect to a radial direction extending outward from the combustor centerline axis, and an inner connection connecting the inner dome connecting flange, the inner cowl connecting flange, and the inner liner connecting flange in an inner stacked arrangement extending in the radial direction, wherein the outer stacked arrangement comprises the outer cowl connecting flange arranged on an inner side of the outer stacked arrangement, the outer liner connecting flange arranged on an outer side of the outer stacked arrangement, and the outer dome connecting flange arranged between the outer cowl connecting flange and the outer liner connecting flange, and the inner stacked arrangement comprises the inner liner connecting flange arranged on an inner side of the inner stacked arrangement, the inner dome connecting flange arranged on an outer side of the inner stacked arrangement, and the inner cowl connecting flange arranged between the inner liner connecting flange and the inner dome connecting flange.

A combustor for a gas turbine engine, the combustor including a ceramic matrix composite (CMC) dome structure including an outer dome connecting flange extending in a longitudinal direction with respect to a combustor centerline axis from an outer side of a dome plate, and an inner dome connecting flange extending in the longitudinal direction from an inner side of the dome plate, a cowl structure including a single yoke outer cowl connecting flange extending in the longitudinal direction from an outer cowl flange root portion of the cowl structure, and a single yoke inner cowl connecting flange extending in the longitudinal direction from an inner cowl flange root portion of the cowl structure, a CMC outer liner including an outer liner connecting flange extending in the longitudinal direction at an upstream end of the CMC outer liner, a CMC inner liner including an inner liner connecting flange extending in the longitudinal direction, an outer connection connecting the outer dome connecting flange, the outer cowl connecting flange, and the outer liner connecting flange in an outer stacked arrangement with respect to a radial direction extending outward from the combustor centerline axis, and an inner connection connecting the inner dome connecting flange, the inner cowl connecting flange, and the inner liner connecting flange in an inner stacked arrangement extending in the radial direction, wherein the outer stacked arrangement comprises the outer dome connecting flange arranged on an inner side of the outer stacked arrangement, the outer cowl connecting flange arranged on an outer side of the outer stacked arrangement, and the outer liner connecting flange arranged between the outer dome connecting flange and the outer cowl connecting flange, and the inner stacked arrangement comprises the inner liner connecting flange arranged on an inner side of the inner stacked arrangement, the inner dome connecting flange arranged on an outer side of the inner stacked arrangement, and the inner cowl connecting flange arranged between the inner liner connecting flange and the inner dome connecting flange.

A combustor for a gas turbine engine, the combustor including a ceramic matrix composite (CMC) dome structure including an outer dome connecting flange extending in a longitudinal direction with respect to a combustor centerline axis from an outer side of a dome plate, and an inner dome connecting flange extending in the longitudinal direction from an inner side of the dome plate, a cowl structure including a single yoke outer cowl connecting flange extending in the longitudinal direction from an outer cowl flange root portion of the cowl structure, and a single yoke inner cowl connecting flange extending in the longitudinal direction from an inner cowl flange root portion of the cowl structure, a CMC outer liner including an outer liner connecting flange extending in the longitudinal direction at an upstream end of the CMC outer liner, a CMC inner liner including an inner liner connecting flange extending in the longitudinal direction, an outer connection connecting the outer dome connecting flange, the outer cowl connecting flange, and the outer liner connecting flange in an outer stacked arrangement with respect to a radial direction extending outward from the combustor centerline axis, and an inner connection connecting the inner dome connecting flange, the inner cowl connecting flange, and the inner liner connecting flange in an inner stacked arrangement extending in the radial direction, wherein the outer stacked arrangement comprises the outer dome connecting flange arranged on an inner side of the outer stacked arrangement, the outer liner connecting flange arranged on an outer side of the outer stacked arrangement, and the outer cowl connecting flange arranged between the outer dome connecting flange and the outer liner connecting flange, and the inner stacked arrangement comprises the inner cowl connecting flange arranged on an inner side of the inner stacked arrangement, the inner dome connecting flange arranged on an outer side of the inner stacked arrangement, and the inner liner connecting flange arranged between the inner cowl connecting flange and the inner dome connecting flange.

A combustor for a gas turbine engine, the combustor including a ceramic matrix composite (CMC) dome structure including an outer dome connecting flange extending in a longitudinal direction with respect to a combustor centerline axis from an outer side of a dome plate, and an inner dome connecting flange extending in the longitudinal direction from an inner side of the dome plate, a cowl structure including a single yoke outer cowl connecting flange extending in the longitudinal direction from an outer cowl flange root portion of the cowl structure, and a single yoke inner cowl connecting flange extending in the longitudinal direction from an inner cowl flange root portion of the cowl structure, a CMC outer liner including an outer liner connecting flange extending in the longitudinal direction at an upstream end of the CMC outer liner, a CMC inner liner including an inner liner connecting flange extending in the longitudinal direction, an outer connection connecting the outer dome connecting flange, the outer cowl connecting flange, and the outer liner connecting flange in an outer stacked arrangement with respect to a radial direction extending outward from the combustor centerline axis, and an inner connection connecting the inner dome connecting flange, the inner cowl connecting flange, and the inner liner connecting flange in an inner stacked arrangement extending in the radial direction, wherein the outer stacked arrangement comprises the outer cowl connecting flange arranged on an inner side of the outer stacked arrangement, the outer liner connecting flange arranged on an outer side of the outer stacked arrangement, and the outer dome connecting flange arranged between the outer cowl connecting flange and the outer liner connecting flange, and the inner stacked arrangement comprises the inner cowl connecting flange arranged on an inner side of the inner stacked arrangement, the inner dome connecting flange arranged on an outer side of the inner stacked arrangement, and the inner liner connecting flange arranged between the inner cowl connecting flange and the inner dome connecting flange.

A combustor for a gas turbine engine, the combustor including a ceramic matrix composite (CMC) dome structure including an outer dome connecting flange extending in a longitudinal direction with respect to a combustor center-line axis from an outer side of a dome plate, and an inner dome connecting flange extending in the longitudinal direction from an inner side of the dome plate, a cowl structure including a single yoke outer cowl connecting flange extending in the longitudinal direction from an outer cowl flange root portion of the cowl structure, and a single yoke inner cowl connecting flange extending in the longitudinal direction from an inner cowl flange root portion of the cowl structure, a CMC outer liner including an outer liner connecting flange extending in the longitudinal direction at an upstream end of the CMC outer liner, a CMC inner liner including an inner liner connecting flange extending in the longitudinal direction, an outer connection connecting the outer dome connecting flange, the outer cowl connecting flange, and the outer liner connecting flange in an outer stacked arrangement with respect to a radial direction extending outward from the combustor centerline axis, and an inner connection connecting the inner dome connecting flange, the inner cowl connecting flange, and the inner liner connecting flange in an inner stacked arrangement extending in the radial direction, wherein the outer stacked arrangement comprises the outer dome connecting flange arranged on an inner side of the outer stacked arrangement, the outer cowl connecting flange arranged on an outer side of the outer stacked arrangement, and the outer liner connecting flange arranged between the outer dome connecting flange and the outer cowl connecting flange, and the inner stacked arrangement comprises the inner cowl connecting flange arranged on an inner side of the inner stacked arrangement, the inner dome connecting flange arranged on an outer side of the inner stacked arrangement, and the inner liner connecting flange arranged between the inner cowl connecting flange and the inner dome connecting flange.

A combustor for a gas turbine engine, the combustor including a ceramic matrix composite (CMC) dome structure including an outer dome connecting flange extending in a longitudinal direction with respect to a combustor center-line axis from an outer side of a dome plate, and an inner dome connecting flange extending in the longitudinal direction from an inner side of the dome plate, a cowl structure including a single yoke outer cowl connecting flange extending in the longitudinal direction from an outer cowl flange root portion of the cowl structure, and a single yoke inner cowl connecting flange extending in the longitudinal direction from an inner cowl flange root portion of the cowl structure, a CMC outer liner including an outer liner connecting flange extending in the longitudinal direction at an upstream end of the CMC outer liner, a CMC inner liner including an inner liner connecting flange extending in the longitudinal direction, an outer connection connecting the outer dome connecting flange, the outer cowl connecting flange, and the outer liner connecting flange in an outer stacked arrangement with respect to a radial direction extending outward from the combustor centerline axis, and an inner connection connecting the inner dome connecting flange, the inner cowl connecting flange, and the inner liner connecting flange in an inner stacked arrangement extending in the radial direction, wherein the outer stacked arrangement comprises the outer dome connecting flange arranged on an inner side of the outer stacked arrangement, the outer liner connecting flange arranged on an outer side of the outer stacked arrangement, and the outer cowl connecting flange arranged between the outer dome connecting flange and the outer liner connecting flange, and the inner stacked arrangement comprises the inner liner connecting flange arranged on an inner side of the inner stacked arrangement, the inner cowl connecting flange arranged on an outer side of the inner stacked arrangement, and the inner dome connecting flange arranged between the inner liner connecting flange and the inner cowl connecting flange.

A combustor for a gas turbine engine, the combustor including a ceramic matrix composite (CMC) dome structure including an outer dome connecting flange extending in a longitudinal direction with respect to a combustor center-line axis from an outer side of a dome plate, and an inner dome connecting flange extending in the longitudinal direction from an inner side of the dome plate, a cowl structure including a single yoke outer cowl connecting flange extending in the longitudinal direction from an outer cowl flange root portion of the cowl structure, and a single yoke inner cowl connecting flange extending in the longitudinal direction from an inner cowl flange root portion of the cowl structure, a CMC outer liner including an outer liner connecting flange extending in the longitudinal direction at an upstream end of the CMC outer liner, a CMC inner liner including an inner liner connecting flange extending in the longitudinal direction, an outer connection connecting the outer dome connecting flange, the outer cowl connecting flange, and the outer liner connecting flange in an outer stacked arrangement with respect to a radial direction extending outward from the combustor centerline axis, and an inner connection connecting the inner dome connecting flange, the inner cowl connecting flange, and the inner liner connecting flange in an inner stacked arrangement extending in the radial direction, wherein the outer stacked arrangement comprises the outer cowl connecting flange arranged on an inner side of the outer stacked arrangement, the outer liner connecting flange arranged on an outer side of the outer stacked arrangement, and the outer dome connecting flange arranged between the outer cowl connecting flange and the outer liner connecting flange, and the inner stacked arrangement comprises the inner liner connecting flange arranged on an inner side of the inner stacked arrangement, the inner cowl connecting flange arranged on an outer side of the inner stacked arrangement, and the inner dome connecting flange arranged between the inner liner connecting flange and the inner cowl connecting flange.

A combustor for a gas turbine engine, the combustor including a ceramic matrix composite (CMC) dome structure including an outer dome connecting flange extending in a longitudinal direction with respect to a combustor center-line axis from an outer side of a dome plate, and an inner dome connecting flange extending in the longitudinal direction from an inner side of the dome plate, a cowl structure including a single yoke outer cowl connecting flange extending in the longitudinal direction from an outer cowl flange root portion of the cowl structure, and a single yoke inner cowl connecting flange extending in the longitudinal direction from an inner cowl flange root portion of the cowl structure, a CMC outer liner including an outer liner connecting flange extending in the longitudinal direction at an upstream end of the CMC outer liner, a CMC inner liner including an inner liner connecting flange extending in the longitudinal direction, an outer connection connecting the outer dome connecting flange, the outer cowl connecting flange, and the outer liner connecting flange in an outer stacked arrangement with respect to a radial direction extending outward from the combustor centerline axis, and an inner connection connecting the inner dome connecting flange, the inner cowl connecting flange, and the inner liner connecting flange in an inner stacked arrangement extending in the radial direction, wherein the outer stacked arrangement comprises the outer dome connecting flange arranged on an inner side of the outer stacked arrangement, the outer cowl connecting flange arranged on an outer side of the outer stacked arrangement, and the outer liner connecting flange arranged between the outer dome connecting flange and the outer cowl connecting flange, and the inner stacked arrangement comprises the inner liner connecting flange arranged on an inner side of the inner stacked arrangement, the inner cowl connecting flange arranged on an outer side of the inner stacked arrangement, and the inner dome connecting flange arranged between the inner liner connecting flange and the inner cowl connecting flange.

A gas turbine engine including a compressor section, a turbine section, and a combustion section that receives an airflow from the compressor section, the airflow being provided to a combustion chamber within a combustor of the combustion section, the combustor including a ceramic matrix composite (CMC) dome structure including an outer dome connecting flange extending in a longitudinal direction with respect to a combustor centerline axis from an outer side of a dome plate, and an inner dome connecting flange extending in the longitudinal direction from an inner side of the dome plate, a cowl structure including a single yoke outer cowl connecting flange extending in the longitudinal direction from an outer cowl flange root portion of the cowl structure, and a single yoke inner cowl connecting flange extending in the longitudinal direction from an inner cowl flange root portion of the cowl structure, a CMC outer liner including an outer liner connecting flange extending in the longitudinal direction at an upstream end of the CMC outer liner, a CMC inner liner including an inner liner connecting flange extending in the longitudinal direction, an outer connection connecting the outer dome connecting flange, the outer cowl connecting flange, and the outer liner connecting flange in an outer stacked arrangement with respect to a radial direction extending outward from the combustor centerline axis, and an inner connection connecting the inner dome connecting flange, the inner cowl connecting flange, and the inner liner connecting flange in an inner stacked arrangement extending in the radial direction.

The gas turbine engine according to the preceding clause, wherein the outer stacked arrangement comprises the outer dome connecting flange arranged on an inner side of the outer stacked arrangement, the outer liner connecting flange arranged on an outer side of the outer stacked arrangement, and the outer cowl connecting flange arranged between the outer dome connecting flange and the outer liner connecting flange, and the inner stacked arrangement comprises the inner liner connecting flange arranged on an inner side of the inner stacked arrangement, the inner dome connecting flange arranged on an outer side of the inner stacked arrangement, and the inner cowl connecting flange arranged between the inner liner connecting flange and the inner dome connecting flange.

The gas turbine engine according to any preceding clause, wherein the outer stacked arrangement comprises the outer cowl connecting flange arranged on an inner side of the outer stacked arrangement, the outer liner connecting flange arranged on an outer side of the outer stacked arrangement, and the outer dome connecting flange arranged between the outer cowl connecting flange and the outer liner connecting flange, and the inner stacked arrangement comprises the inner liner connecting flange arranged on an inner side of the inner stacked arrangement, the inner dome connecting flange arranged on an outer side of the inner stacked arrangement, and the inner cowl connecting flange arranged between the inner liner connecting flange and the inner dome connecting flange.

The gas turbine engine according to any preceding clause, wherein the outer stacked arrangement comprises the outer dome connecting flange arranged on an inner side of the outer stacked arrangement, the outer cowl connecting flange arranged on an outer side of the outer stacked arrangement, and the outer liner connecting flange arranged between the outer dome connecting flange and the outer cowl connecting flange, and the inner stacked arrangement comprises the inner liner connecting flange arranged on an inner side of the inner stacked arrangement, the inner dome connecting flange arranged on an outer side of the inner stacked arrangement, and the inner cowl connecting flange arranged between the inner liner connecting flange and the inner dome connecting flange.

The gas turbine engine according to any preceding clause, wherein the outer stacked arrangement comprises the outer dome connecting flange arranged on an inner side of the outer stacked arrangement, the outer liner connecting flange arranged on an outer side of the outer stacked arrangement, and the outer cowl connecting flange arranged between the outer dome connecting flange and the outer cowl connecting flange, and the inner stacked arrangement comprises the inner cowl connecting flange arranged on an inner side of the inner stacked arrangement, the inner dome connecting flange arranged on an outer side of the inner stacked arrangement, and the inner liner connecting flange arranged between the inner cowl connecting flange and the inner dome connecting flange.

The gas turbine engine according to any preceding clause, wherein the outer stacked arrangement comprises the outer cowl connecting flange arranged on an inner side of the outer stacked arrangement, the outer liner connecting flange arranged on an outer side of the outer stacked arrangement, and the outer dome connecting flange arranged between the outer cowl connecting flange and the outer liner connecting flange, and the inner stacked arrangement comprises the inner cowl connecting flange arranged on an inner side of the inner stacked arrangement, the inner dome connecting flange arranged on an outer side of the inner stacked arrangement, and the inner liner connecting flange arranged between the inner cowl connecting flange and the inner dome connecting flange.

The gas turbine engine according to any preceding clause, wherein the outer stacked arrangement comprises the outer dome connecting flange arranged on an inner side of the outer stacked arrangement, the outer cowl connecting flange arranged on an outer side of the outer stacked arrangement, and the outer liner connecting flange arranged between the outer dome connecting flange and the outer cowl connecting flange, and the inner stacked arrangement comprises the inner cowl connecting flange arranged on an inner side of the inner stacked arrangement, the inner dome connecting flange arranged on an outer side of the inner stacked arrangement, and the inner liner connecting flange arranged between the inner cowl connecting flange and the inner dome connecting flange.

The gas turbine engine according to any preceding clause, wherein the outer stacked arrangement comprises the outer dome connecting flange arranged on an inner side of the outer stacked arrangement, the outer liner connecting flange arranged on an outer side of the outer stacked arrangement, and the outer cowl connecting flange arranged between the outer dome connecting flange and the outer liner connecting flange, and the inner stacked arrangement comprises the inner liner connecting flange arranged on an inner side of the inner stacked arrangement, the inner cowl connecting flange arranged on an outer side of the inner stacked arrangement, and the inner dome connecting flange arranged between the inner liner connecting flange and the inner cowl connecting flange.

The gas turbine engine according to any preceding clause, wherein the outer stacked arrangement comprises the outer cowl connecting flange arranged on an inner side of the outer stacked arrangement, the outer liner connecting flange arranged on an outer side of the outer stacked arrangement, and the outer dome connecting flange arranged between the outer cowl connecting flange and the outer liner connecting flange, and the inner stacked arrangement comprises the inner liner connecting flange arranged on an inner side of the inner stacked arrangement, the inner cowl connecting flange arranged on an outer side of the inner stacked arrangement, and the inner dome connecting flange arranged between the inner liner connecting flange and the inner cowl connecting flange.

The gas turbine engine according to any preceding clause, wherein the outer stacked arrangement comprises the outer dome connecting flange arranged on an inner side of the outer stacked arrangement, the outer cowl connecting flange arranged on an outer side of the outer stacked arrangement, and the outer liner connecting flange arranged between the outer dome connecting flange and the outer cowl connecting flange, and the inner stacked arrangement comprises the inner liner connecting flange arranged on an inner side of the inner stacked arrangement, the inner cowl connecting flange arranged on an outer side of the inner stacked arrangement, and the inner dome connecting flange arranged between the inner liner connecting flange and the inner cowl connecting flange.

The gas turbine engine according to any preceding clause, wherein the outer cowl flange root portion includes an outer discourager wall portion extending radially inward from an upstream end of the outer cowl connecting flange, an upstream end of the outer liner connecting flange is arranged adjacent to the outer discourager wall portion to define an outer liner connecting flange discourager, and an upstream end of the outer dome connecting flange is arranged adjacent to the outer discourager wall portion to define an outer dome connecting flange discourager.

The gas turbine engine according to any preceding clause, wherein the outer cowl flange root portion includes an outer discourager wall portion extending radially outward from an upstream end of the outer cowl connecting flange, an upstream end of the outer liner connecting flange is arranged adjacent to the outer discourager wall portion to define an outer liner connecting flange discourager, and an upstream end of the outer dome connecting flange is arranged adjacent to the outer discourager wall portion to define an outer dome connecting flange discourager.

The gas turbine engine according to any preceding clause, wherein the inner cowl flange root portion includes an inner discourager wall portion extending radially inward from an upstream end of the inner cowl connecting flange, an upstream end of the inner liner connecting flange is arranged adjacent to the inner discourager wall portion to define an inner liner connecting flange discourager, and an upstream end of the inner dome connecting flange is arranged adjacent to the inner discourager wall portion to define an inner dome connecting flange discourager.

The gas turbine engine according to any preceding clause, wherein the inner cowl flange root portion includes an inner discourager wall portion extending radially outward from an upstream end of the inner cowl connecting flange, an upstream end of the inner liner connecting flange is arranged adjacent to the inner discourager wall portion to define an inner liner connecting flange discourager, and an upstream end of the inner dome connecting flange is arranged adjacent to the inner discourager wall portion to define an inner dome connecting flange discourager.

The gas turbine engine according to any preceding clause, wherein the outer connection comprises at least one outer connection bushing extending through at least one of the outer liner connecting flange and the outer dome connecting flange, an outer connection fastener extending through the at least one outer connection bushing, and a retention member connected to the outer connection fastener.

The gas turbine engine according to any preceding clause, wherein the inner connection comprises at least one inner connection bushing extending through at least one of the inner liner connecting flange and the inner dome connecting flange, an inner connection fastener extending through the at least one inner connection bushing, and a retention member connected to the inner connection fastener.

The gas turbine engine according to any preceding clause, wherein the outer cowl flange root portion includes a first outer discourager wall portion extending radially outward from an upstream end of the outer cowl connecting flange, and a second outer discourager wall portion extending radially inward from the upstream end of the outer cowl connecting flange.

The gas turbine engine according to any preceding clause, wherein an upstream end of the outer liner connecting flange is arranged adjacent to the first outer discourager wall portion to define an outer liner connecting flange discourager, and an upstream end of the outer dome connecting flange is arranged adjacent to the second outer discourager wall portion to define an outer dome connecting flange discourager.

The gas turbine engine according to any preceding clause, wherein the inner cowl flange root portion includes a first inner discourager wall portion extending radially outward from an upstream end of the inner cowl connecting flange, and a second inner discourager wall portion extending radially inward from the upstream end of the inner cowl connecting flange.

The gas turbine engine according to any preceding clause, wherein an upstream end of the inner liner connecting flange is arranged adjacent to the second inner discourager wall portion to define an inner liner connecting flange discourager, and an upstream end of the inner dome connecting flange is arranged adjacent to the first inner discourager wall portion to define an inner dome connecting flange discourager.

The gas turbine engine according to any preceding clause, wherein the at least one outer connection bushing includes a first outer connection bushing and a second outer connection bushing.

The gas turbine engine according to any preceding clause, wherein an inner side of the first outer connection bushing is in contact with an outer side of the outer cowl connecting flange, an outer side of the first outer connection bushing is in contact with a head of the outer connection fastener, an outer side of the second outer connection bushing is in contact with an inner side of the outer cowl connecting flange, and an inner side of the second outer connection bushing is in contact with a retention member.

The gas turbine engine according to any preceding clause, wherein the at least one inner connection bushing includes a first inner connection bushing and a second inner connection bushing.

The gas turbine engine according to any preceding clause, wherein an inner side of the first inner connection bushing is in contact with an outer side of the inner cowl connecting flange, an outer side of the first inner connection bushing is in contact with a retention member, an outer side of the second outer connection bushing is in contact with an inner side of the inner cowl connecting flange, and an inner side of the second outer connection bushing is in contact with a head of the inner connection fastener.

The gas turbine engine according to any preceding clause, wherein the at least one outer connection bushing comprises an outer connection bushing extending through both the outer dome connecting flange and the through the outer liner connecting flange, an outer side of the outer connection bushing engaging with an inner side of the outer cowl connecting flange, and an inner side of the outer connection bushing engaging with one of a head of an outer connection fastener or with a retention member.

The gas turbine engine according to any preceding clause, wherein the at least one inner connection bushing comprises an inner connection bushing extending through both the inner dome connecting flange and the through the inner liner connecting flange, an inner side of the inner connection bushing engaging with an outer side of the inner cowl connecting flange, and an outer side of the inner connection bushing engaging with one of a head of an inner connection fastener or with a retention member.

Although the foregoing description is directed to some exemplary embodiments of the present disclosure, other variations and modifications will be apparent to those skilled in the art, and may be made without departing from the present disclosure. Moreover, features described in connection with one embodiment of the present disclosure may be used in conjunction with other embodiments, even if not explicitly stated above.

We claim:

1. A combustor for a gas turbine engine, the combustor comprising:
   a ceramic matrix composite (CMC) dome structure including an outer dome connecting flange extending in a longitudinal direction with respect to a combustor centerline axis from an outer side of a dome plate, and an inner dome connecting flange extending in the longitudinal direction from an inner side of the dome plate;
   a cowl structure including an outer cowl flange root portion, a single yoke outer cowl connecting flange extending in the longitudinal direction from the outer cowl flange root portion of the cowl structure, an inner cowl flange root portion, a single yoke inner cowl connecting flange extending in the longitudinal direction from the inner cowl flange root portion of the cowl structure, and at least one of:
   the outer cowl flange root portion having a first outer discourager wall portion extending radially outward from an upstream end of the outer cowl connecting flange, and a second outer discourager wall portion extending radially inward from the upstream end of the outer cowl connecting flange, or
   the inner cowl flange root portion having a first inner discourager wall portion extending radially outward from an upstream end of the inner cowl connecting flange, and a second inner discourager wall portion extending radially inward from the upstream end of the inner cowl connecting flange;
   a CMC outer liner including an outer liner connecting flange extending in the longitudinal direction at an upstream end of the CMC outer liner;
   a CMC inner liner including an inner liner connecting flange extending in the longitudinal direction at an upstream end of the CMC inner liner;
   an outer connection connecting the outer dome connecting flange, the outer cowl connecting flange, and the outer liner connecting flange in an outer stacked arrangement with respect to a radial direction extending outward from the combustor centerline axis; and
   an inner connection connecting the inner dome connecting flange, the inner cowl connecting flange, and the inner liner connecting flange in an inner stacked arrangement extending in the radial direction.

2. The combustor according to claim 1, wherein the outer stacked arrangement comprises the outer dome connecting flange arranged on an inner side of the outer stacked arrangement, the outer liner connecting flange arranged on an outer side of the outer stacked arrangement, and the outer cowl connecting flange arranged between the outer dome connecting flange and the outer liner connecting flange, and the inner stacked arrangement comprises the inner liner connecting flange arranged on an inner side of the inner stacked arrangement, the inner dome connecting flange arranged on an outer side of the inner stacked arrangement, and the inner cowl connecting flange arranged between the inner liner connecting flange and the inner dome connecting flange.

3. The combustor according to claim 1, wherein the outer stacked arrangement comprises the outer cowl connecting flange arranged on an inner side of the outer stacked arrangement, the outer liner connecting flange arranged on an outer side of the outer stacked arrangement, and the outer dome connecting flange arranged between the outer cowl connecting flange and the outer liner connecting flange, and the inner stacked arrangement comprises the inner liner connecting flange arranged on an inner side of the inner stacked arrangement, the inner dome connecting flange arranged on an outer side of the inner stacked arrangement, and the inner cowl connecting flange arranged between the inner liner connecting flange and the inner dome connecting flange.

4. The combustor according to claim 1, wherein the outer stacked arrangement comprises the outer dome connecting flange arranged on an inner side of the outer stacked arrangement, the outer cowl connecting flange arranged on an outer side of the outer stacked arrangement, and the outer liner connecting flange arranged between the outer dome connecting flange and the outer cowl connecting flange, and the inner stacked arrangement comprises the inner liner connecting flange arranged on an inner side of the inner stacked arrangement, the inner dome connecting flange arranged on an outer side of the inner stacked arrangement, and the inner cowl connecting flange arranged between the inner liner connecting flange and the inner dome connecting flange.

5. The combustor according to claim 1, wherein the outer stacked arrangement comprises the outer dome connecting flange arranged on an inner side of the outer stacked arrangement, the outer liner connecting flange arranged on an outer side of the outer stacked arrangement, and the outer cowl connecting flange arranged between the outer dome connecting flange and the outer liner connecting flange, and the inner stacked arrangement comprises the inner cowl connecting flange arranged on an inner side of the inner stacked arrangement, the inner dome connecting flange arranged on an outer side of the inner stacked arrangement, and the inner liner connecting flange arranged between the inner cowl connecting flange and the inner dome connecting flange.

6. The combustor according to claim 1, wherein the outer stacked arrangement comprises the outer cowl connecting flange arranged on an inner side of the outer stacked arrangement, the outer liner connecting flange arranged on an outer side of the outer stacked arrangement, and the outer dome connecting flange arranged between the outer cowl connecting flange and the outer liner connecting flange, and the inner stacked arrangement comprises the inner cowl connecting flange arranged on an inner side of the inner stacked arrangement, the inner dome connecting flange arranged on an outer side of the inner stacked arrangement, and the inner liner connecting flange arranged between the inner cowl connecting flange and the inner dome connecting flange.

7. The combustor according to claim 1, wherein the outer stacked arrangement comprises the outer dome connecting flange arranged on an inner side of the outer stacked arrangement, the outer cowl connecting flange arranged on an outer side of the outer stacked arrangement, and the outer liner connecting flange arranged between the outer dome connecting flange and the outer cowl connecting flange, and the inner stacked arrangement comprises the inner cowl connecting flange arranged on an inner side of the inner stacked arrangement, the inner dome connecting flange arranged on an outer side of the inner stacked arrangement, and the inner liner connecting flange arranged between the inner cowl connecting flange and the inner dome connecting flange.

8. The combustor according to claim 1, wherein the outer stacked arrangement comprises the outer dome connecting flange arranged on an inner side of the outer stacked arrangement, the outer liner connecting flange arranged on an outer side of the outer stacked arrangement, and the outer cowl connecting flange arranged between the outer dome connecting flange and the outer liner connecting flange, and the inner stacked arrangement comprises the inner liner connecting flange arranged on an inner side of the inner stacked arrangement, the inner cowl connecting flange arranged on an outer side of the inner stacked arrangement, and the inner dome connecting flange arranged between the inner liner connecting flange and the inner cowl connecting flange.

9. The combustor according to claim 1, wherein the outer stacked arrangement comprises the outer cowl connecting flange arranged on an inner side of the outer stacked arrangement, the outer liner connecting flange arranged on an outer side of the outer stacked arrangement, and the outer dome connecting flange arranged between the outer cowl connecting flange and the outer liner connecting flange, and the inner stacked arrangement comprises the inner liner connecting flange arranged on an inner side of the inner stacked arrangement, the inner cowl connecting flange arranged on an outer side of the inner stacked arrangement, and the inner dome connecting flange arranged between the inner liner connecting flange and the inner cowl connecting flange.

10. The combustor according to claim 1, wherein the outer stacked arrangement comprises the outer dome connecting flange arranged on an inner side of the outer stacked arrangement, the outer cowl connecting flange arranged on an outer side of the outer stacked arrangement, and the outer liner connecting flange arranged between the outer dome connecting flange and the outer cowl connecting flange, and the inner stacked arrangement comprises the inner liner connecting flange arranged on an inner side of the inner stacked arrangement, the inner cowl connecting flange arranged on an outer side of the inner stacked arrangement, and the inner dome connecting flange arranged between the inner liner connecting flange and the inner cowl connecting flange.

11. The combustor according to claim 1, wherein the outer cowl flange root portion includes an outer discourager wall portion extending radially inward from an upstream end of the outer cowl connecting flange, an upstream end of the outer liner connecting flange is arranged adjacent to the outer discourager wall portion to define an outer liner connecting flange discourager, and an upstream end of the outer dome connecting flange is arranged adjacent to the outer discourager wall portion to define an outer dome connecting flange discourager.

12. The combustor according to claim 1, wherein the outer cowl flange root portion includes an outer discourager wall portion extending radially outward from an upstream end of the outer cowl connecting flange, an upstream end of the outer liner connecting flange is arranged adjacent to the outer discourager wall portion to define an outer liner connecting flange discourager, and an upstream end of the outer dome connecting flange is arranged adjacent to the outer discourager wall portion to define an outer dome connecting flange discourager.

13. The combustor according to claim 1, wherein the inner cowl flange root portion includes an inner discourager wall portion extending radially inward from an upstream end of the inner cowl connecting flange, an upstream end of the inner liner connecting flange is arranged adjacent to the inner discourager wall portion to define an inner liner connecting flange discourager, and an upstream end of the inner dome connecting flange is arranged adjacent to the inner discourager wall portion to define an inner dome connecting flange discourager.

14. The combustor according to claim 1, wherein the inner cowl flange root portion includes an inner discourager wall portion extending radially outward from an upstream end of the inner cowl connecting flange, an upstream end of the inner liner connecting flange is arranged adjacent to the inner discourager wall portion to define an inner liner connecting flange discourager, and an upstream end of the inner dome connecting flange is arranged adjacent to the inner discourager wall portion to define an inner dome connecting flange discourager.

15. The combustor according to claim 1, wherein the outer connection comprises at least one outer connection bushing extending through at least one of the outer liner connecting flange and the outer dome connecting flange, an outer connection fastener extending through the at least one outer connection bushing, and a retention member connected to the outer connection fastener.

16. The combustor according to claim 15, wherein the at least one outer connection bushing includes an outer liner connecting flange bushing extending through the outer liner connecting flange and an outer dome connecting flange bushing extending through the outer dome connecting flange.

17. The combustor according to claim 1, wherein the inner connection comprises at least one inner connection bushing extending through at least one of the inner liner connecting flange and the inner dome connecting flange, an inner connection fastener extending through the at least one inner connection bushing, and a retention member connected to the inner connection fastener.

18. The combustor according to claim 17, wherein the at least one inner connection bushing includes an inner liner connecting flange bushing extending through the inner liner connecting flange and an inner dome connecting flange bushing extending through the inner dome connecting flange.

19. The combustor according to claim 1, wherein an upstream end of the outer liner connecting flange is arranged adjacent to the first outer discourager wall portion to define an outer liner connecting flange discourager, and an upstream end of the outer dome connecting flange is arranged adjacent to the second outer discourager wall portion to define an outer dome connecting flange discourager.

20. The combustor according to claim 1, wherein an upstream end of the inner liner connecting flange is arranged adjacent to the second inner discourager wall portion to define an inner liner connecting flange discourager, and an upstream end of the inner dome connecting flange is arranged adjacent to the first inner discourager wall portion to define an inner dome connecting flange discourager.

* * * * *